United States Patent
Günther et al.

(10) Patent No.: US 10,590,228 B2
(45) Date of Patent: Mar. 17, 2020

(54) PRODUCTION OF LOW-EMISSION POLYURETHANES

(71) Applicant: Evonik Degussa GmbH, Essen (DE)

(72) Inventors: Thomas Günther, Neuss (DE); Mladen Vidakovic, Duisburg (DE); Collins Wettey, Essen (DE)

(73) Assignee: Evonik Operations GmbH, Essen (DE)

(*) Notice: Subject to any disclaimer, the term of this patent is extended or adjusted under 35 U.S.C. 154(b) by 122 days.

(21) Appl. No.: 15/556,841

(22) PCT Filed: Mar. 18, 2016

(86) PCT No.: PCT/EP2016/055931
§ 371 (c)(1),
(2) Date: Sep. 8, 2017

(87) PCT Pub. No.: WO2016/162183
PCT Pub. Date: Oct. 13, 2016

(65) Prior Publication Data
US 2018/0044463 A1    Feb. 15, 2018

(30) Foreign Application Priority Data
Apr. 8, 2015  (EP) .................................. 15162741

(51) Int. Cl.
| | | |
|---|---|---|
| *C08G 18/32* | (2006.01) | |
| *C08G 18/40* | (2006.01) | |
| *C08G 18/48* | (2006.01) | |
| *C08G 18/61* | (2006.01) | |
| *C08G 18/63* | (2006.01) | |
| *C08G 18/66* | (2006.01) | |
| *C08G 18/76* | (2006.01) | |
| *C08J 9/14* | (2006.01) | |
| *C08G 18/18* | (2006.01) | |
| *C08G 101/00* | (2006.01) | |

(52) U.S. Cl.
CPC ..... *C08G 18/1825* (2013.01); *C08G 18/3206* (2013.01); *C08G 18/3275* (2013.01); *C08G 18/4009* (2013.01); *C08G 18/4072* (2013.01); *C08G 18/4829* (2013.01); *C08G 18/61* (2013.01); *C08G 18/632* (2013.01); *C08G 18/6688* (2013.01); *C08G 18/7621* (2013.01); *C08G 18/7664* (2013.01); *C08J 9/141* (2013.01); *C08G 18/18* (2013.01); *C08G 2101/0008* (2013.01); *C08G 2101/0025* (2013.01); *C08J 2203/14* (2013.01); *C08J 2205/06* (2013.01); *C08J 2205/10* (2013.01)

(58) Field of Classification Search
CPC ............... C08G 18/18; C08G 18/1825; C08G 18/3206; C08G 18/3275; C08G 18/4009; C08G 18/4072; C08G 18/4829; C08G 18/61; C08G 18/632; C08G 18/6688; C08G 18/7621; C08G 18/7664; C08G 2101/0008; C08G 2101/0025; C08J 9/141; C08J 2203/14; C08J 2205/06; C08J 2205/10

See application file for complete search history.

(56) References Cited

U.S. PATENT DOCUMENTS

| | | | |
|---|---|---|---|
| 2,834,748 A | 5/1958 | Bailey et al. | |
| 2,917,480 A | 12/1959 | Bailey et al. | |
| 3,346,557 A | 10/1967 | Patton, Jr. et al. | |
| 3,629,308 A | 12/1971 | Bailey et al. | |
| 3,900,424 A | 8/1975 | Inoue et al. | |
| 3,933,695 A | 1/1976 | Omietanski et al. | |
| 3,953,383 A | 4/1976 | Inoue et al. | |
| 4,042,540 A | 8/1977 | Lammerting et al. | |
| 4,147,847 A | 4/1979 | Schweiger | |
| 4,456,696 A | 6/1984 | Arbir et al. | |
| 4,500,704 A | 2/1985 | Kruper, Jr. et al. | |
| 4,855,379 A | 8/1989 | Budnik et al. | |
| 5,306,737 A | 4/1994 | Burkhart et al. | |
| 5,321,051 A | 6/1994 | Burkhart et al. | |
| 5,357,018 A | 10/1994 | Burkhart et al. | |
| 5,844,010 A | 12/1998 | Burkhart et al. | |
| 6,359,022 B1 | 3/2002 | Hickey et al. | |
| 6,596,663 B1 | 7/2003 | Tamano et al. | |
| 6,762,274 B2 | 7/2004 | Waddington et al. | |
| 6,924,321 B2 | 8/2005 | Casati et al. | |
| 7,671,103 B2 | 3/2010 | Eilbracht et al. | |
| 7,671,104 B2 | 3/2010 | Heinemann et al. | |
| 7,838,566 B2 | 11/2010 | Glos et al. | |

(Continued)

FOREIGN PATENT DOCUMENTS

| | | |
|---|---|---|
| CA | 2008639 A1 | 8/1990 |
| DE | 2533074 A1 | 3/1976 |

(Continued)

OTHER PUBLICATIONS

German Language International Search Report dated May 30, 2016 in PCT/EP2016/055931 (4 pages).

(Continued)

*Primary Examiner* — Melissa A Rioja
(74) *Attorney, Agent, or Firm* — Philip P. McCann; Nexsen Pruet PLLC

(57) ABSTRACT

The use of a mixture (M) comprising nitrogen compound(s) in the preparation of polyurethanes, especially polyurethane foams, wherein said mixture (M) comprises the following constituents:
(a) N,N-dimethylaminopropylamine, at least in an amount of ≥5% by weight, advantageously in an amount of ≥20% by weight, preferably 20%-95% by weight, further preferably 30%-70% by weight, especially 30%-60% by weight, and
(b) at least one solvent, especially water, advantageously in a total amount of ≥5% by weight, preferably ≥10% by weight, more preferably 10%-60% by weight, especially 10%-40% by weight,
% by weight based in each case on the overall mixture (M),
is described.

14 Claims, No Drawings

(56) References Cited

U.S. PATENT DOCUMENTS

| | | |
|---|---|---|
| 8,247,467 B2 | 8/2012 | Mijolovic et al. |
| 8,303,843 B2 | 11/2012 | Glos et al. |
| 8,735,458 B2 | 5/2014 | Glos et al. |
| 9,725,553 B2 | 8/2017 | Takahashi |
| 2002/0103091 A1 | 8/2002 | Kodali |
| 2004/0102535 A1 | 5/2004 | Casati et al. |
| 2006/0135634 A1* | 6/2006 | Guidetti ............ C08G 18/1825 521/99 |
| 2006/0167125 A1 | 7/2006 | Bauer et al. |
| 2006/0229375 A1 | 10/2006 | Hsiao et al. |
| 2006/0293400 A1 | 12/2006 | Wiltz, Jr. et al. |
| 2007/0072951 A1 | 3/2007 | Bender et al. |
| 2007/0238800 A1 | 10/2007 | Neal et al. |
| 2007/0270518 A1 | 11/2007 | Nutzel |
| 2007/0282026 A1 | 12/2007 | Grigsby, Jr. et al. |
| 2008/0234402 A1 | 9/2008 | Lehmann et al. |
| 2009/0088489 A1 | 4/2009 | Terheiden et al. |
| 2011/0257280 A1 | 10/2011 | Glos et al. |
| 2011/0306694 A1 | 12/2011 | Glos et al. |
| 2012/0041088 A1* | 2/2012 | Ishida ................ C08G 18/3265 521/129 |
| 2015/0191565 A1* | 7/2015 | Takahashi .......... C08G 18/1808 521/129 |
| 2015/0299948 A1* | 10/2015 | Pan ..................... B41M 5/0017 524/591 |
| 2015/0337072 A1 | 11/2015 | Schmitz et al. |
| 2016/0075846 A1 | 3/2016 | Krebs et al. |
| 2016/0304666 A1 | 10/2016 | Emmerich-Smolczyk et al. |
| 2016/0304685 A1 | 10/2016 | Emmerich-Smolczyk et al. |
| 2017/0152343 A1 | 6/2017 | Günther et al. |
| 2017/0174817 A1 | 6/2017 | Günther et al. |
| 2017/0226264 A1 | 8/2017 | Günther et al. |

FOREIGN PATENT DOCUMENTS

| | | |
|---|---|---|
| DE | 4229402 A1 | 3/1994 |
| DE | 4239054 A1 | 5/1994 |
| DE | 102004001408 A1 | 7/2005 |
| DE | 102007046860 A1 | 4/2009 |
| EP | 0380993 A2 | 8/1990 |
| EP | 0493836 A1 | 7/1992 |
| EP | 533202 A1 | 3/1993 |
| EP | 0780414 A2 | 6/1997 |
| EP | 0839852 A2 | 5/1998 |
| EP | 0656382 B1 | 8/1998 |
| EP | 867465 A1 | 9/1998 |
| EP | 1138708 A1 | 10/2001 |
| EP | 1161474 A1 | 12/2001 |
| EP | 1537159 A1 | 6/2005 |
| EP | 1544235 A1 | 6/2005 |
| EP | 1678232 A2 | 7/2006 |
| EP | 1712578 A1 | 10/2006 |
| EP | 1777252 A1 | 4/2007 |
| EP | 1977825 A1 | 10/2008 |
| EP | 1985642 A1 | 10/2008 |
| EP | 1985644 A1 | 10/2008 |
| EP | 2042534 A1 | 4/2009 |
| EP | 2104696 B1 | 9/2013 |
| EP | 2868679 A1 | 5/2015 |
| JP | H04-65416 A | 3/1992 |
| JP | 2014-028946 A | 2/2014 |
| JP | 2014-125490 A | 7/2014 |
| WO | 0047647 A1 | 8/2000 |
| WO | 0058383 A1 | 10/2000 |
| WO | 0158976 A1 | 8/2001 |
| WO | 0222702 A1 | 3/2002 |
| WO | 03029320 A1 | 4/2003 |
| WO | 2004020497 A1 | 3/2004 |
| WO | 2004060956 A1 | 7/2004 |
| WO | 2004096882 A1 | 11/2004 |
| WO | 2005033167 A1 | 4/2005 |
| WO | 2005063841 A1 | 7/2005 |
| WO | 2005085310 A2 | 9/2005 |
| WO | 2005118668 A1 | 12/2005 |
| WO | 2006055396 A1 | 5/2006 |
| WO | 2006094227 A2 | 9/2006 |
| WO | 2006116456 A1 | 11/2006 |
| WO | 2007111828 A2 | 10/2007 |
| WO | 2008058913 A1 | 5/2008 |
| WO | 2009058367 A1 | 5/2009 |
| WO | 2009130470 A1 | 10/2009 |
| WO | 2010028362 A1 | 3/2010 |
| WO | 2011163133 A1 | 12/2011 |
| WO | 2013022932 A1 | 2/2013 |
| WO | 2013102053 A1 | 7/2013 |
| WO | 2014/003177 A1 | 1/2014 |
| WO | WO2014003177 A1 * | 2/2014 |

OTHER PUBLICATIONS

German Language Written Opinion dated May 30, 2016 in PCT/EP2016/055931 (9 pages).

Günther et al., U.S. Appl. No. 15/323,154, filed Dec. 30, 2016.

International Search Report dated May 30, 2016 in PCT/EP2016/055931 (3 pages).

* cited by examiner

PRODUCTION OF LOW-EMISSION POLYURETHANES

This application is a national stage application under 35 U.S.C. § 371 of International Application No. PCT/EP2016/055931 filed 18 Mar. 2016, which claims priority to EP Application No. 15162741.1 filed 8 Apr. 2015, the disclosures of which are expressly incorporated herein by reference.

FIELD

The present invention lies in the field of nitrogen compounds, especially of amines, and of polyurethanes. It relates especially to the use of a mixture comprising nitrogen compound(s) for production of polyurethanes, especially polyurethane foams, and to polyurethane systems obtained using such mixtures and compositions comprising such mixtures.

BACKGROUND

The use of tertiary amines in the production of polyurethane systems is known. A multitude of structurally different amines are used here as catalysts. Polyurethane systems are, for example, polyurethane coatings, polyurethane adhesives, polyurethane sealants, polyurethane elastomers or polyurethane foams, also referred to as PU foams.

Particularly in the case of production of polyurethane foams, tertiary amines play an important role, since what is called the blow reaction—water reacts with isocyanate to form carbon dioxide as blowing gas—and the gel reaction—polyols react with isocyanates to give urethanes, which leads to a rise in the molar mass and corresponding gelation—have to be matched exactly to one another here, in order that a high-quality foam can form.

Polyurethane foams are cellular and/or microcellular polyurethane materials and can be divided roughly into closed-cell or partly closed-cell rigid polyurethane foams and open-cell or partly open-cell flexible polyurethane foams. Rigid polyurethane foams are used predominantly as insulation materials, for example in refrigerator systems or in the thermal insulation of buildings. Flexible polyurethane foams are used in a multitude of technical applications in industry and the domestic sector, for example for sound deadening, for production of mattresses or for cushioning of furniture. A particularly important market for various types of PU foams, such as conventional flexible foams based on ether or ester polyols, cold-cure flexible foams, also referred to as cold-cure foams hereinafter (frequently also as "high-resilience" (HR) foams), and rigid foams, and also foams having properties between these classifications, is the automobile industry. It is possible here, for example, to use rigid foams as inner roof liner, ester foams as interior door trim and for die-cut sun visors, and cold-cure and flexible foams for seat systems.

Flexible foams may also be subdivided into cold-cure flexible foams and hot-cure flexible foams, as described for example in EP 2042534 A1, fully incorporated herein by reference.

A challenge in the provision of polyurethane systems and especially the polyurethane foams is that of product emissions. These should ideally be as low as possible.

In particular, there has been a constant increase in the last few years in the severity of the demands made by automobile manufacturers on their foam suppliers and the demands made by the mattress and furniture upholstery industry with regard to the emission specifications of polyurethane systems. Subjects of analytical determination in this context include the fogging characteristics (fogging means the precipitation of fog on the windscreen resulting from condensation of volatile constituents that condense readily at room temperature) of materials in automobile interiors, in order to increase driving safety, and the content of volatile organic compounds (VOCs) in these materials resulting from thermal desorption, summarized, for example, in the analysis method according to test methods VDA 278 of the German Association of the Automotive Industry, last updated in October 2011. Methods at room temperature may also be of significance for the classification, for example test chamber methods according to DIN Standard DIN EN ISO 16000-9:2008-04, which are of particular relevance for applications in the mattress and furniture upholstery sector. As well as the quantitative determination of the total emissions (VOC and fogging), some methods also require the attribution of the emissions to individual chemical compounds. For instance, pollutant tests in independent testing and certification systems, for example for textile raw materials, intermediates and end products at all processing stages in the context of the Öko-Tex Standard 100, focus on amines too as potential pollutants. The specified limits for attaining such certificates are often reflected in the demands on the foam specifications in the production of polyurethane foams, especially when the foams are being produced for the automobile, furniture upholstery or mattress industry. The constantly increasing severity of classifications and limits for amines is requiring, according to the application and demand, a constant adjustment of the formulations and in some cases even substitution of established nitrogen compounds, especially of amine catalysts, for new technologies.

A particular challenge in polyurethane foam production is that the use of emission-optimized amine catalysts should not cause any disadvantages in the foaming operation and with regard to the properties of the finished polyurethane system. In this connection, particular attention is paid to the activity of the catalysts. It is well known that emission-optimized amine catalysts generally have lesser catalytic activity than conventional non-reactive amine catalysts. This is because amines of high molecular weight or amines bearing isocyanate-reactive groups, called reactive amines, are generally used here. Amines of high molecular weight are no longer volatile because of the high molar mass, are less readily emitted from the foam and have a lower molecular mobility, but this also reduces catalytic activity. Reactive amines are incorporated into the PU matrix through reaction via their functional groups, usually OH or NH groups, thus hindering the mobility thereof and leading to lower amine emissions. In both cases, amounts of amine catalysts used are in some cases considerably greater than for established non-reactive amine catalysts. Moreover, even some established reactive amine catalysts no longer meet the demands of the emission tests (e.g. VDA 278) because of the increasing severity of the limits as described above.

A further difficulty, particularly in connection with the use of reactive amines, is also what is called recatalysis. As a result of the reduction in the activation barrier, catalysts accelerate not just the forward reaction but also the reverse reaction. Foams which have been produced with reactive amines thus often exhibit distinctly worsened ageing characteristics, for example in the humid ageing test or in the case of dry heat ageing.

A further difficulty is that reactive amine catalysts in particular can lead to troublesome odor nuisance in foam production, but also in relation to the finished foam.

There is therefore quite generally a constant need for further catalysts, preferably nitrogenous catalysts, especially amines or amine mixtures, which have good processibility and high catalytic activity, are safely handled and are suitable for production of polyurethanes and polyurethane foams having low emission or at worst associated with minor emissions, preferably suitable for production of low-odor polyurethane systems, without any adverse effect on important foam properties such as foam hardness or ageing characteristics.

Against this background, the specific problem to be solved by the present invention was that of providing polyurethanes having low amine emissions or at worst associated with minor amine emissions, especially polyurethane foams, preferably flexible polyurethane foams, preferably having low odor.

SUMMARY

It has been found that, surprisingly, the aforementioned problem is solved by the subject-matter of the present invention. The subject-matter of the present invention is the use of a mixture (M) comprising nitrogen compound(s) in the preparation of polyurethanes, especially polyurethane foams, preferably flexible polyurethane foams, wherein said mixture (M) comprises the following constituents:
  (a) N,N-dimethylaminopropylamine, at least in an amount of ≥5% by weight, advantageously in an amount of ≥20% by weight, preferably 20%-95% by weight, further preferably 30%-70% by weight, especially 30%-60% by weight, and
  (b) at least one solvent, especially water, advantageously in a total amount of ≥5% by weight, preferably ≥10% by weight, more preferably 10%-60% by weight, especially 10%-40% by weight,
  % by weight based in each case on the overall mixture (M).

The mixture (M) for use must accordingly contain at least N,N-dimethylaminopropylamine and a solvent, but preferably at least one further nitrogen compound is present, especially as elucidated in detail further down.

DETAILED DESCRIPTION

The present invention enables the provision of polyurethanes having low amine emissions or at worst associated with minor amine emissions, especially polyurethane foams, preferably flexible polyurethane foams, preferably having low odor.

"Low amine emissions" in the context of the present invention means especially that the polyurethane system, preferably the polyurethane foam, further preferably the flexible polyurethane foam, especially preferably the hot-cure flexible polyurethane foam, preferably for production of mattresses and/or furniture upholstery, has an amine emission of ≥0 µg/m³ and ≤40 µg/m³, preferably ≤10 µg/m³, more preferably ≤5 µg/m³, determined correspondingly by the test chamber method to DIN Standard DIN EN ISO 16000-9:2008-04, 24 hours after loading the test chamber, and/or that the polyurethane system, preferably the polyurethane foam, especially the flexible polyurethane foam, more preferably the cold-cure flexible polyurethane foam, preferably for production of polyurethanes for use in the automobile industry, especially in automobile interiors, for example as inner roof lining, inner trim of doors, die-cut sun visors, steering wheels and/or seat systems, does not have any amine emissions which lead to discoloration of PVC films according to Volkswagen test method VW PV 3937, meaning that the grey PVC film preferably does not become discolored, but especially does not turn reddish, and/or that the polyurethane system, preferably the polyurethane foam, especially the flexible polyurethane foam, more preferably the cold-cure flexible polyurethane foam, preferably for production of polyurethanes for use in the automobile industry, especially in automobile interiors, for example as inner roof lining, inner trim of doors, die-cut sun visors, steering wheels and/or seat systems, has an amine emission, also referred to hereinafter as VOC emission or VOC value to VDA 278 (VOC=volatile organic compounds) of ≥0 µg/g and ≤40 µg/g, preferably ≤10 µg/g, more preferably ≤5 µg/g, in accordance with the VDA 278 analysis method in the version of October 2011 "Thermal Desorption Analysis of Organic Emissions for the Characterization of Non-Metallic Materials for Automobiles" (30 minutes at 90° C.), and/or that the polyurethane system, especially the flexible polyurethane foam, more preferably the cold-cure flexible polyurethane foam, preferably for production of polyurethanes for use in the automobile industry, especially in automobile interiors, for example as inner roof lining, inner trim of doors, die-cut sun visors, steering wheels and/or seat systems, has an amine emission, also referred to hereinafter as fog emission or fog value to VDA 278 (fog: nonvolatile substances which condense readily at room temperature and contribute to fogging of the windscreen) of ≥0 µg/g and ≤40 µg/g, preferably ≤10 µg/g, more preferably ≤5 µg/g, in accordance with the VDA 278 analysis method in the version of October 2011 (60 minutes at 120° C.). VDA is the German Association of the Automotive Industry (www.vda.de). Depending on the use intended for the polyurethane systems, in particular the foamed polyurethane materials, an example being their application in the automotive industry, a vehicle manufacturer may specify limits for total emissions of volatile organic compounds ($VOC_{tot}$ and/or $fog_{tot}$), for example $VOC_{tot} \leq 100$ µg/g and/or $fog_{tot} \leq 250$ µg/g. It is accordingly all the more important that the amine contribution to total emission ($VOC_{amine}$ and/or $fog_{amine}$) be minimized. The determination methods according to test method VW PV 3937 and VDA 278 chosen in the context of the present invention are elucidated in detail in the examples section.

The present invention thus enables the provision of polyurethane systems, preferably of polyurethane foams, especially of flexible polyurethane foams, having particularly low emissions with respect to amine emissions, even given different demands, and preferably being free of such emissions.

Preferred lower limits for the use of N,N-dimethylaminopropylamine in the mixture (M) according to the invention may especially also be 40% by weight, 50% by weight, 60% by weight or 70% by weight, meaning that preferred ranges for the amount of N,N-dimethylaminopropylamine in the mixture (M) according to the invention may, for example, be 50%-95% by weight, 60%-95% by weight or 70%-95% by weight, % by weight based in each case on the overall mixture (M).

In a preferred embodiment of the invention, the mixture (M) according to the invention comprises, as component (c), additionally at least one further nitrogen compound (other than N,N-dimethylaminopropylamine), advantageously an amine, preferably an amine having at least one tertiary amine function, preferably in a total amount of ≥5% by weight, further preferably 10%-95% by weight, especially 10%-60% by weight, % by weight based in each case on the overall mixture (M).

Preferred lower limits for the use of the further nitrogen compounds (other than N,N-dimethylaminopropylamine) as component (c) in the mixture (M) according to the invention may especially also be 15% by weight, 20% by weight, 25% by weight, 30% by weight, 35% by weight or 40% by weight, meaning that preferred ranges for the amount of the further nitrogen compounds (other than N,N-dimethylaminopropylamine) in the mixture (M) according to the invention may, for example, be 15%-60% by weight, 20%-60% by weight, 25%-60% by weight, 30%-60% by weight, 35%-60% by weight or 40%-60% by weight, % by weight based in each case on the total use amount of the further nitrogen compounds in the overall mixture (M).

All the nitrogen compounds usable in mixtures (M) according to the invention (including N,N-dimethylaminopropylamine) may also be used in protonated and/or quaternized form (singly or multiply quaternized, preferably singly quaternized) in the context of this invention.

For possible quaternization of nitrogen compounds usable in the mixture (M) according to the invention, it is possible to use any reagents known as quaternizing reagent. Preferably, quaternizing agents used are alkylating agents, for example dimethyl sulphate, methyl chloride or benzyl chloride, preferably methylating agents such as dimethyl sulphate in particular. Quaternization is likewise possible with alkylene oxides, for example ethylene oxide, propylene oxide or butylene oxide, preferably with subsequent neutralization with inorganic or organic acids.

Nitrogen compounds usable in the mixture (M) according to the invention can be converted to the corresponding protonated compounds by reaction with organic or inorganic acids. These protonated compounds may be preferable, for example, when, for example, a slowed polyurethane reaction is to be achieved or when the reaction mixture is to have enhanced flow in use.

Useful organic acids include, for example, especially any hereinbelow recited organic acids, for example carboxylic acids having 1 to 36 carbon atoms (aromatic or aliphatic, linear or branched), for example formic acid, lactic acid, 2-ethylhexanoic acid, salicylic acid and neodecanoic acid, or else polymeric acids such as, for example, polyacrylic or polymethacrylic acids. Inorganic acids used may, for example, be phosphorus-based acids, sulphur-based acids or boron-based acids.

In the context of this invention, however, particular preference is given to the use of mixtures (M) containing non-quaternized or non-protonated nitrogen compounds.

The mixtures (M) used in accordance with the invention are particularly suitable as catalysts for preparation of polyurethanes, especially of polyurethane foams, preferably of flexible polyurethane foams, more preferably of cold-cure flexible polyurethane foams. This corresponds to a preferred embodiment of the invention. They can catalyse either the gel reaction or the blow reaction in the course of foaming, and advantageously further isocyanate reactions as described below.

Advantageously, the present invention also enables the provision of low-odor polyurethane systems, preferably polyurethane foams, especially of flexible polyurethane foams. "Low-odor" means here that the resulting polyurethane system has a minimum product odor, which can be tested especially by olfactory testing by a panel of trained odor testers.

Advantageously, the present invention also contributes to maintaining or even to improving the ageing characteristics, in particular the heat resistance and/or ageing resistance on heating (thermal ageing), of polyurethane systems, preferably foamed polyurethane materials, in particular flexible polyurethane foams. Such ageing phenomena are often closely related to the choice of catalyst system for production of the polyurethane systems, and generally lead to material fatigue. With the mixtures (M) according to the invention, it is possible here in an advantageous manner to maintain or even improve the heat stability and/or service life of the corresponding polyurethane systems compared to polyurethane systems which have been produced with conventional catalysts according to the prior art. Advantageously, this effect is observable in particular in polyurethane foams, preferably flexible slab stock foams and/or mouldable and high-elasticity flexible foams, in particular as humid ageing or dry heat ageing to DIN Standard DIN EN ISO 2440:2000-01, for flexible slabstock foams especially after dry heat ageing at a temperature of 70, 100, 120, 125 and/or 140° C. and an ageing time of 2, 4, 16, 22, 24, 48, 72 and/or 168 hours preferably at 2, 24 and/or 168 hours, when the foaming process is carried out using mixtures (M) according to the invention as alternatives to standard catalysts according to the prior art.

Advantageously, the present invention enables facilitated handling and also better processing in the production of polyurethane systems, especially flexible foams, very particularly of mouldable and high-elasticity flexible foams. It has thus been found, for example, that in the case of reuse of the storage container, i.e. after single or repeated opening of the mixture container, containing the mixtures (M) according to the invention, much more constant and reproducible performance can be achieved in the foaming in the case of non-inventive amine mixtures which especially likewise contain N,N-dimethylaminopropylamine. More particularly, there is also no adverse effect on the desired material properties, for example in the form of foam defects. This means an enormous simplification of user operations.

A further advantage of the present invention is that it enables the provision of PU systems having low discoloration or even entirely free of discoloration with regard to other plastics. In the context of this invention, it has been found that the presence of polyurethane systems, especially of polyurethane foams, especially in automobile interiors, can lead to undesirable discoloring of other plastics parts, especially consisting of PVC. For example, there can be discoloration of plastic covers, for example the plastic cover of inner roof liners in automobiles. This is exceptionally deleterious to the user's aesthetic perception. As has been found in the context of this invention, this discoloration is at least partly attributable to the presence of polyurethane systems, especially foams. It has now been found that, surprisingly, the polyurethane systems provided in accordance with the invention lead at least to lower discoloration of these plastics extending as far as freedom from discoloration, compared to polyurethane systems according to the prior art, comprising conventional amine catalysts. Thus, our invention thus enables the provision of polyurethane systems, especially of polyurethane foams, preferably of polyurethanes for use in the automobile industry, especially in automobile interiors, for example as inner roof liners, interior door trim, die-cut sun visors, steering wheels and/or seat systems, in which case the polyurethane systems provided in accordance with the invention lead especially to lower discoloration of plastics, especially plastic covers, especially in automobile interiors, compared to the use of conventional polyurethane systems. This can be shown particularly by a PVC discoloration test according to the Volkswagen test method VW PV 3937.

The subject-matter provided by the invention is illustratively described hereinbelow without any intention to limit the invention to these illustrative embodiments. Where ranges, general formulae or compound classes are specified hereinbelow, these are intended to include not only the relevant ranges or groups of compounds explicitly mentioned but also all subranges and subgroups of compounds that may be obtained by extracting individual values (ranges) or compounds. When documents are cited in the context of the present description, the contents thereof, particularly with regard to the subject-matter that forms the context in which the document has been cited, are considered in their entirety to form part of the disclosure content of the present invention. Unless stated otherwise, percentages are figures in per cent by weight. When average values are reported hereinbelow, the values in question are weight averages, unless stated otherwise. When parameters which have been determined by measurement are reported hereinafter, they have been determined at a temperature of 25° C. and a pressure of 101 325 Pa, unless stated otherwise.

Polyurethane (PU) in the context of the present invention is especially understood to mean a product obtainable by reaction of polyisocyanates and polyols, or compounds having isocyanate-reactive groups. Further functional groups in addition to the polyurethane can also be formed in the reaction, examples being uretdiones, carbodiimides, isocyanurates, allophanates, biurets, ureas and/or uretimines. Therefore, PU is understood in the context of the present invention to mean both polyurethane and polyisocyanurate, polyureas, and polyisocyanate reaction products containing uretdione, carbodiimide, allophanate, biuret and uretimine groups. In the context of the present invention, polyurethane foam (PU foam) is understood to mean foam which is obtained as reaction product based on polyisocyanates and polyols or compounds having isocyanate-reactive groups. Further functional groups in addition to the polyurethane can also be formed in the reaction, examples being allophanates, biurets, ureas, carbodiimides, uretdiones, isocyanurates or uretimines. Therefore, PU foams are understood in the context of the present invention to mean both polyurethane foams (PUR foams) and polyisocyanurate foams (PIR foams). Preferred polyurethane foams are flexible polyurethane foams, rigid polyurethane foams and integral polyurethane foams. Particular preference is given in this context to conventional flexible polyurethane foams based on ether or ester polyols, highly elastic cold-cure polyurethane foams (frequently also referred to as "high-resilience" (HR) foams), viscoelastic polyurethane foams, semirigid polyurethane foams and rigid polyurethane foams, and also foams which have properties between these classifications and are used in the automobile industry.

According to a preferred embodiment of the invention, the component (c) used in the mixture (M) contains at least one amine selected from the group comprising 3-(diethylaminopropyl)amine, 1-(3-aminopropyl)pyrrolidine, 1,1'-{[3-(dimethylamino)propyl]imino}bis-2-propanol, bis(3-dimethylaminopropyl)amine, bis(3-(pyrrolidin-1-yl)propyl)amine, N,N-bis[3-(dimethylamino)propyl]-N',N'-dimethyl propane-1,3-diamine, tris(3-(pyrrolidin-1-yl)propyl)amine, 1-[bis[3-(dimethylamino)propyl]amino]-2-propanol, N-(3-(dimethylamino)propyl)-N,N,N'-trimethylpropane-1,3-diamine, 2-((3-(dimethylamino)propyl)methylamino)ethanol, 1(-3-(dimethylamino)propyl)urea, 1,3-bis(3-(dimethylamino)propyl)urea, 1,4-di azabicyclo[2.2.2]octane and/or 1,4-diazabicyclo-[2.2.2]octane-2-methanol, preferably selected from the group comprising 3-(diethylaminopropyl)amine, 1-(3-aminopropyl)pyrrolidine, 1,1-{[3-(dimethyl amino)propyl]imino}bis-2-propanol, bis(3-dimethylaminopropyl)amine, N,N-bis[3-(dimethylamino)propyl]-N',N'-dimethylpropane-1,3-diamine, 1-[bis[3-(dimethylamino)propyl]amino]-2-propanol, 1(-3-(dimethylamino)propyl)urea, 1,3-bis(3-(dimethylamino)propyl)urea, more preferably selected from the group comprising 1,1'-{[3-(dimethylamino)propyl]imino}bis-2-propanol, bis(3-dimethylaminopropyl)amine, 1-[bis[3-(dimethylamino)propyl]amino]-2-propanol, 1(-3-(dimethylamino)propyl)urea and/or 1,3-bis(3-(dimethylamino)propyl)urea, especially preferably selected from the group comprising 1,1'-{[3-(dimethylamino)propyl]imino}bis-2-propanol, bis(3-dimethylaminopropyl)amine and/or 1-[bis[3-(dimethylamino)propyl]amino]-2-propanol, advantageously in a total amount of ≥5% by weight, preferably 10%-95% by weight, especially 10%-60% by weight,% by weight based in each case on the overall mixture (M). Preferred lower limits for the use of the aforementioned further nitrogen compounds as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compounds in the mixture (M) according to the invention may, for example, be 15%-60% by weight, 20%-60% by weight, 25%-60% by weight, 30%-60% by weight, 35%-60% by weight or 40%-60% by weight, % by weight based in each case on the total use amount of the aforementioned further nitrogen compounds in the overall mixture (M).

According to a further preferred embodiment of the invention, the component (c) used in the mixture (M) contains at least one amine selected from the group comprising 1,1'-{[3-(dimethylamino)propyl]imino}bis-2-propanol, bis(3-dimethylaminopropyl)amine and/or 1-[bis[3-(dimethylamino)propyl]amino]-2-propanol, advantageously in a total amount of ≥5% by weight, preferably 10%-95% by weight, especially 10%-60% by weight, % by weight based in each case on the overall mixture (M). Preferred lower limits for the use of the aforementioned further nitrogen compounds as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compounds in the mixture (M) according to the invention may, for example, be 15%-60% by weight, 20%-60% by weight, 25%-60% by weight, 30%-60% by weight, 35%-60% by weight or 40%-60% by weight, % by weight based in each case on the total use amount of the aforementioned further nitrogen compounds in the overall mixture (M).

According to a further particularly preferred embodiment of the invention, the component (c) used in the mixture (M) contains at least bis(3-dimethylaminopropyl)amine, advantageously in an amount of ≥5% by weight, preferably 10%-95% by weight, especially 10%-60% by weight,% by weight based in each case on the overall mixture (M), Preferred lower limits for the use of the aforementioned further nitrogen compound as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compound in the mixture (M) according to the invention may, for example, be 15%-60% by weight, 20%-60% by weight, 25%-60% by weight, 30%-60% by weight, 35%-60% by weight or 40%-60% by weight, % by weight based in each case on the use amount of the aforementioned further nitrogen compound in the overall mixture (M).

According to a very particularly preferred embodiment of the invention, the component (c) used in the mixture (M) contains at least 1,1'-{[3-(dimethylamino)propyl]imino}bis-2-propanol, advantageously in an amount of ≥5% by weight, preferably 10%-95% by weight, especially 10%-60% by weight,% by weight based in each case on the overall mixture (M), Preferred lower limits for the use of the aforementioned further nitrogen compound as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compound in the mixture (M) according to the invention may, for example, be 15%-60% by weight, 20%-60% by weight, 25%-60% by weight, 30%-60% by weight, 35%-60% by weight or 40%-60% by weight, % by weight based in each case on the use amount of the aforementioned further nitrogen compound in the overall mixture (M).

According to a further preferred embodiment of the invention, the component (c) used in the mixture (M) contains at least one amine selected from the group comprising 2-(dimethylamino)ethanol, 2-(diethylamino)ethanol, 1-(2-hydroxyethyl)pyrrolidine, 2-(2-(dimethylamino)ethoxy)ethanol, 2-(2-(diethylamino)ethoxy)ethanol, 2-(2-(pyrrolidin-1-yl)ethoxy)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, N,N,N',N'-tetramethyl-1,6-hexanediamine, 2-((2-(dimethylamino)ethyl)(methyl)amino)ethanol, 2-((2-(2-(dimethylamino)ethoxy)ethyl)(methyl)amino)ethanol and/or N-(2-(2-(dimethylamino)ethoxy)ethyl)-N-methylpropane-1,3-diamine, preferably selected from the group comprising 2-(dimethylamino)ethanol, 2-(2-(dimethylamino)ethoxy)ethanol, bis(2-dimethylaminoethyl) ether, 1,-(oxybis(ethane-2,1-diyl))dipyrrolidine, N-(2-(dimethylamino)ethyl)-N,N',N'-trimethylethylene-1,2-diamine, N,N,N',N'-tetramethyl -1,6-hexanediamine, 2-((2-(2-(dimethylamino)ethoxy)ethyl)(methyl)amino)ethanol and/or N-(2-(2-(dimethylamino)ethoxy)ethyl)-N-methylpropane-1,3-diamine, more preferably selected from the group comprising 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol and/or N-(2-(2-(dimethylamino)ethoxy)ethyl)-N-methylpropane-1,3-diamine, especially preferably selected from the group comprising 2-(dimethylamino)ethanol, bis(2-dimethylaminoethyl)ether, 2-((2-(2-(dimethylamino)ethoxy)ethyl)(methyl)amino)ethanol and/or N-(2-(2-(dimethylamino)ethoxy)ethyl)-N-methylpropane-1,3-diamine, advantageously in a total amount of ≥5% by weight, preferably 10%-95% by weight, especially 10%-60% by weight,% by weight based in each case on the overall mixture (M). Preferred lower limits for the use of the aforementioned further nitrogen compounds as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compounds in the mixture (M) according to the invention may, for example, be 15%-60% by weight, 20%-60% by weight, 25%-60% by weight, 30%-60% by weight, 35%-60% by weight or 40%-60% by weight, % by weight based in each case on the total use amount of the aforementioned further nitrogen compounds in the overall mixture (M).

According to a further preferred embodiment of the invention, the component (c) used in the mixture (M) contains at least one amine selected from the group comprising 2-(dimethylamino)ethanol, bis(2-dimethylaminoethyl)ether, 2-((2-(2-(dimethylamino)ethoxy)ethyl)(methyl)amino)ethanol and/or N-(2-(2-(dimethylamino)ethoxy)ethyl)-N-methylpropane-1,3-diamine, advantageously in a total amount of ≥5% by weight, preferably 10%-95% by weight, especially 10%-60% by weight, % by weight based in each case on the overall mixture (M). Preferred lower limits for the use of the aforementioned further nitrogen compounds as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compounds in the mixture (M) according to the invention may, for example, be 15%-60% by weight, 20%-60% by weight, 25%-60% by weight, 30%-60% by weight, 35%-60% by weight or 40%-60% by weight, % by weight based in each case on the total use amount of the aforementioned further nitrogen compounds in the overall mixture (M).

If component (c) comprises at least one nitrogen compound selected from the group comprising 1,1'-{[3-(dimethylamino)propyl]imino}bis-2-propanol, 3-(diethylaminopropyl)amine, 1-(3-aminopropyl)pyrrolidine, 1,1'-{[3-(dimethylamino)propyl]imino}bis-2-propanol, bis(3-dimethylaminopropyl)amine, bis(3-(pyrrolidin-1-yl)propyl)amine, N,N-bis[3-(dimethylamino)propyl]-N',N'-dimethylpropane-1,3-diamine, tris(3-(pyrrolidin-1-yl)propyl)amine, 1-[bis[3-(dimethylamino)propyl]amino]-2-propanol, N-(3-(dimethylamino)propyl)-N,N,N'-trimethylpropane-1,3-diamine, 2-((3-(dimethylamino)propyl)methylamino)ethanol, 1(-3-(dimethylamino)propyl)urea, 1,3-bis(3-(dimethylamino)propyl)urea, 1,4-diazabicyclo[2.2.2]octane and/or 1,4-diazabicyclo-[2.2.2]octane-2-methanol, 2-(dimethylamino)ethanol, 2-(diethylamino)ethanol, 1-(2-hydroxyethyl)pyrrolidine, 2-(2-(dimethylamino)ethoxy)ethanol, '2-(2-(diethylamino)ethoxy)ethanol, 2-(2-(pyrrolidin-1-yl)ethoxy)ethanol, bis(2-dimethylaminoethyl) ether, 1,1'-(oxybis(ethane-2,1-diyl)) dipyrrolidine, N-(2-(dimethylamino)ethyl)-N,N',N'-trimethylethylene-1,2-diamine, N,N,N',N'-tetramethyl-1,6-hexanediamine, 2-((2-(dimethylamino)ethyl)(methyl)amino)ethanol, 2-((2-(2-(dimethylamino)ethoxy)ethyl)(methyl)amino)ethanol, N-(2-(2-(dimethylamino)ethoxy)ethyl)-N-methylpropane-1,3-diamine, 1,1,3,3-tetramethylguanidine, 1,5,7-triazabicyclo[4.4.0]dec-5-ene, 2,2,4-trimethyl-1-oxa-4-aza-2-silacyclohexane and/or 4-ethyl-2,2-dimethyl-1-oxa-4-aza-2-silacyclohexane, preferably selected from the group comprising 1,1'-{[3-(dimethylamino)propyl]imino 1 bis-2-propanol, bis(3-dimethylaminopropyl)amine and/or 1-[bis[3-(dimethylamino)propyl]amino]-2-propanol, 1,4-diazabicyclo[2.2.2]octane, 2-(dimethylamino)ethanol, bis(2-dimethylaminoethyl) ether, 1,1'-(oxybis(ethane-2, 1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine, 1,1,3,3-tetramethylguanidine, 1,5,7-triazabicyclo[4.4.0]dec-5-ene, 2,2,4-trimethyl-1-oxa-4-aza-2-silacyclohexane and/or 4-ethyl-2,2-dimethyl-1-oxa-4-aza-2-silacyclohexane, more preferably selected from the group comprising 1,1'-{[3-(dimethylamino)propyl]

imino}bis-2-propanol, bis(3-dimethylaminopropyl)amine and/or 1-[bis[3-(dimethylamino)propyl]amino]-2-propanol, 2-(dimethylamino)ethanol, bis(2-dimethylaminoethyl) ether, 2-((2-(2-(dimethylamino)ethoxy)ethyl)(methyl) amino)ethanol, N-(2-(2-(dimethylamino)ethoxy)ethyl)-N-methylpropane-1,3-diamine, 1,1,3,3-tetramethylguanidine, 1,5,7-triazabicyclo[4.4.0]dec-5-ene, 2,2,4-trimethyl-1-oxa-4-aza-2-silacyclohexane and/or 4-ethyl-2,2-dimethyl-1-oxa-4-aza-2-silacyclohexane, especially preferably selected from the group comprising 1,1'-{[3-(dimethylamino)propyl]imino}bis-2-propanol, bis(3-dimethylaminopropyl)amine and/or 1-[bis[3-(dimethylamino)propyl]amino]-2-propanol, advantageously in a total amount of ≥5% by weight, preferably 10%-95% by weight, especially 10%-60% by weight, % by weight based in each case on the overall mixture (M), this is a further preferred embodiment of the invention. Preferred lower limits for the use of the aforementioned further nitrogen compounds as component (c) in the mixture (M) according to the invention may especially also be 15% by weight, 20% by weight, 25% by weight, 30% by weight, 35% by weight or 40% by weight, meaning that preferred ranges for the amount of the aforementioned further nitrogen compounds in the mixture (M) according to the invention may, for example, be 15%-60% by weight, 20%-60% by weight, 25%-60% by weight, 30%-60% by weight, 35%-60% by weight or 40%-60% by weight, % by weight based in each case on the total use amount of the aforementioned further nitrogen compounds in the overall mixture (M).

When the mixture (M) according to the invention has a flashpoint >60° C., measured by the Pensky-Martens method with a closed crucible in accordance with DIN EN ISO 2719:2003-09, more particularly as detailed in the examples section, this is a further preferred embodiment of the invention.

The inventive use where the mixture (M) comprises
(a) N,N-dimethylaminopropylamine, at least in an amount of ≥5% by weight, advantageously in an amount of ≥20% by weight, preferably 20%-95% by weight, more preferably 30%-70% by weight, especially 30%-60% by weight, and
(b) water, at least in an amount of ≥5% by weight, preferably ≥10% by weight, more preferably 10%-60% by weight, especially 10%-40% by weight,
% by weight based in each case on the overall mixture (M), is a preferred embodiment of the invention.

The inventive use too where the mixture (M) comprises
(a) N,N-dimethylaminopropylamine, at least in an amount of ≥5% by weight, advantageously in an amount of ≥20% by weight, preferably 20%-95% by weight, more preferably 30%-70% by weight, especially 30%-60% by weight, and
(b) at least one organic solvent, preferably a polar organic solvent, more preferably a polar protic organic solvent, especially as described further down under solvents (see paragraphs "usable solvents", "solvents usable with preference", "solvents usable with particular preference"), advantageously in a total amount of ≥5% by weight, preferably ≥10% by weight, more preferably 10%-60% by weight, especially 10%-40% by weight,
% by weight based in each case on the overall mixture (M), is a preferred embodiment of the invention.

According to a preferred embodiment of the invention, referred to as embodiment (A) herein, a mixture (M) usable with preference in accordance with the invention comprises
(a) N,N-dimethylaminopropylamine, at least in an amount of ≥5% by weight, advantageously in an amount of ≥20% by weight, preferably 20%-95% by weight, especially 30%-70% by weight, more preferably 30%-60% by weight,
(b) water, at least in an amount of ≥5% by weight, preferably ≥10% by weight, especially 10%-60% by weight, more preferably 10%-40% by weight, and
(c) at least one amine selected from the group comprising 3-(diethylaminopropyl)amine, 1-(3-aminopropyl)pyrrolidine, 1,1'-{[3-(dimethylamino)propyl]imino}bis-2-propanol, bis(3-dimethylaminopropyl)amine, bis(3-(pyrrolidin-1-yl)propyl)amine, N,N-bis[3-(dimethylamino)propyl]-N',N'-dimethylpropane-1,3-diamine, tris(3-(pyrrolidin-1-yl)propyl)amine, 1-[bis[3-(dimethylamino)propyl]amino]-2-propanol, N-(3-(dimethylamino)propyl)-N,N,N'-trimethylpropane-1,3-diamine, 2-((3-(dimethylamino)propyl)methylamino) ethanol, 1(-3-(dimethylamino)propyl)urea, 1,3-bis(3-(dimethylamino)propyl)urea, 1,4-diazabicyclo[2.2.2]octane and/or 1,4-diazabicyclo-[2.2.2]octane-2-methanol, especially selected from the group comprising 3-(diethylaminopropyl)amine, 1-(3-aminopropyl)pyrrolidine, 1,1'-{[3-(dimethylamino)propyl]imino}bis-2-propanol, bis(3-dimethylaminopropyl) amine, N,N-bis[3-(dimethylamino)propyl]-N',N'-dimethylpropane-1,3-diamine, 1-[bis[3-(dimethylamino)propyl]amino]-2-propanol, 1(-3-(dimethylamino)propyl)urea, 1,3-bis(3-(dimethylamino)propyl)urea, preferably selected from the group comprising 1,1'-{[3-(dimethylamino)propyl]imino}bis-2-propanol, bis(3-dimethylaminopropyl) amine, 1-[bis[3-(dimethylamino)propyl]amino]-2-propanol, 1(-3-(dimethylamino)propyl)urea and/or 1,3-bis (3-(dimethylamino)propyl)urea, more preferably selected from the group comprising 1,1'-{[3-(dimethylamino)propyl]imino}bis-2-propanol, bis(3-dimethylaminopropyl)amine and/or 1-[bis[3-(dimethylamino)propyl]amino]-2-propanol, advantageously in a total amount of ≥5% by weight, preferably 20%-95% by weight, especially 20%-60% by weight,
% by weight based in each case on the overall mixture (M).

In a further preferred embodiment, referred to herein as embodiment (A'), in a departure from the above embodiment (A), water as component (b) is replaced by use of at least one organic solvent, especially as described further down under solvents (see paragraphs "usable solvents", "solvents usable with preference", "solvents usable with particular preference"), at least in an amount of ≥5% by weight, preferably ≥10% by weight, especially 10%-60% by weight, more preferably 10%-40% by weight,% by weight based in each case on the overall mixture (M). In a further preferred embodiment, referred to herein as embodiment (A"), in a departure from the above embodiment (A), water as component (b) is replaced by use of a mixture comprising water and at least one organic solvent, especially as described further down under solvents (see paragraphs "usable solvents", "solvents usable with preference", "solvents usable with particular preference"), at least in a total amount of ≥5% by weight, preferably ≥10% by weight, especially 10%-60% by weight, more preferably 10%-40% by weight,% by weight based in each case on the overall mixture (M).

A further preferred embodiment (B) envisages the combination of embodiment (A) with an "additional amine catalyst" present in physically separate form, as defined further down, especially in combination with an additional amine catalyst selected from the group of 2-(dimethylamino)

ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

"Present in physically separate form" means that the additional amine catalyst is not part of the mixture (M) but is metered in separately therefrom in the course of provision of the polyurethane, especially polyurethane foam, more particularly in the case of machine foaming, for example, by preliminary metered addition of the components in the mixing head.

A further preferred embodiment (B') envisages the combination of embodiment (A') with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

A further preferred embodiment (B") envisages the combination of embodiment (A") with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

The aforementioned embodiments (B), (B') and (B") thus mean that, in the production of polyurethane systems, firstly, the mixture (M) according to the invention is used in the sense of the aforementioned embodiment (A), (A') or (A") and, at the same time, an additional amine catalyst present in physically separate form, especially as defined further down, is also used, wherein the additional amine catalyst especially catalyses the blow reaction or is described as a blow catalyst according to the prior art, especially selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

According to a preferred embodiment of the invention, referred to as embodiment (C) herein, a mixture (M) usable with preference in accordance with the invention comprises
  (a) N,N-dimethylaminopropylamine, at least in an amount of ≥5% by weight, advantageously in an amount of ≥20% by weight, preferably 20%-95% by weight, especially 30%-70% by weight, more preferably 30%-60% by weight,
  (b) water, at least in an amount of ≥5% by weight, preferably ≥10% by weight, especially 10%-60% by weight, more preferably 10%-40% by weight, and
  (c) at least one amine selected from the group comprising 1,1'-{[3-(dimethylamino)propyl]imino}bis-2-propanol, bis(3-dimethylaminopropyl)amine and/or 1-[bis[3-(dimethylamino)propyl]amino]-2-propanol, advantageously in a total amount of ≥5% by weight, preferably 20%-95% by weight, especially 20%-60% by weight, % by weight based in each case on the overall mixture (M).

In a further preferred embodiment, referred to herein as embodiment (C'), in a departure from the above embodiment (C), water as component (b) is replaced by use of at least one organic solvent, especially as described further down under solvents (see paragraphs "usable solvents", "solvents usable with preference", "solvents usable with particular preference"), at least in an amount of ≥5% by weight, preferably ≥10% by weight, especially 10%-60% by weight, more preferably 10%-40% by weight,% by weight based in each case on the overall mixture (M).

In a further preferred embodiment, referred to herein as embodiment (C"), in a departure from the above embodiment (C), water as component (b) is replaced by use of a mixture comprising water and at least one organic solvent, especially as described further down under solvents (see paragraphs "usable solvents", "solvents usable with preference", "solvents usable with particular preference"), at least in a total amount of ≥5% by weight, preferably ≥10% by weight, especially 10%-60% by weight, more preferably 10%-40% by weight,% by weight based in each case on the overall mixture (M).

A further preferred embodiment (D) envisages the combination of embodiment (C) with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

A further preferred embodiment (D') envisages the combination of embodiment (C') with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

A further preferred embodiment (D") envisages the combination of embodiment (C") with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

The aforementioned embodiments (D), (D') and (D") thus mean that, in the production of polyurethane systems, firstly, the mixture (M) according to the invention is used in the sense of the aforementioned embodiment (C), (C') or (C") and, at the same time, an additional amine catalyst present in physically separate form, as defined further down, is also used, wherein the additional amine catalyst especially catalyses the blow reaction or is described as a blow catalyst according to the prior art, especially selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

According to a preferred embodiment of the invention, referred to as embodiment (E) herein, a mixture (M) usable with preference in accordance with the invention comprises
(a) N,N-dimethylaminopropylamine, at least in an amount of ≥5% by weight, advantageously in an amount of ≥20% by weight, preferably 20%-95% by weight, especially 30%-70% by weight, more preferably 30%-60% by weight,
(b) water, at least in an amount of ≥5% by weight, preferably ≥10% by weight, especially 10%-60% by weight, more preferably 10%-40% by weight, and
(c) 1,1'-{[3-(dimethylamino)propyl]imino}bis-2-propanol, at least in an amount of ≥5% by weight, preferably 20%-95% by weight, especially 20%-60% by weight,
% by weight based in each case on the overall mixture (M).

In a further preferred embodiment, referred to herein as embodiment (E'), in a departure from the above embodiment (E), water as component (b) is replaced by use of at least one organic solvent, especially as described further down under solvents (see paragraphs "usable solvents", "solvents usable with preference", "solvents usable with particular preference"), at least in an amount of ≥5% by weight, preferably ≥10% by weight, especially 10%-60% by weight, more preferably 10%-40% by weight,% by weight based in each case on the overall mixture (M).

In a further preferred embodiment, referred to herein as embodiment (E"), in a departure from the above embodiment (E), water as component (b) is replaced by use of a mixture comprising water and at least one organic solvent, especially as described further down under solvents (see paragraphs "usable solvents", "solvents usable with preference", "solvents usable with particular preference"), at least in a total amount of ≥5% by weight, preferably ≥10% by weight, especially 10%-60% by weight, more preferably 10%-40% by weight,% by weight based in each case on the overall mixture (M).

A further preferred embodiment (F) envisages the combination of embodiment (E) with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

A further preferred embodiment (F') envisages the combination of embodiment (E') with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

A further preferred embodiment (F") envisages the combination of embodiment (E") with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

The aforementioned embodiments (F), (F') and (F") thus mean that, in the production of polyurethane systems, firstly, the mixture (M) according to the invention is used in the sense of the aforementioned embodiment (E), (E') or (E") and, at the same time, an additional amine catalyst present in physically separate form, as defined further down, is also used, wherein the additional amine catalyst especially catalyses the blow reaction or is described as a blow catalyst according to the prior art, especially selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

According to a preferred embodiment of the invention, referred to as embodiment (G) herein, a mixture (M) usable with preference in accordance with the invention comprises
(a) N,N-dimethylaminopropylamine, at least in an amount of ≥5% by weight, advantageously in an amount of ≥20% by weight, preferably 20%-95% by weight, especially 30%-70% by weight, more preferably 30%-60% by weight,
(b) water, at least in an amount of ≥5% by weight, preferably ≥10% by weight, especially 10%-60% by weight, more preferably 10%-40% by weight, and
(c) bis(3-dimethylaminopropyl)amine, at least in an amount of ≥5% by weight, preferably 20%-95% by weight, especially 20%-60% by weight,
% by weight based in each case on the overall mixture (M).

In a further preferred embodiment, referred to herein as embodiment (G'), in a departure from the above embodiment (G), water as component (b) is replaced by use of at least one organic solvent, especially as described further down under solvents (see paragraphs "usable solvents", "solvents usable with preference", "solvents usable with particular preference"), at least in an amount of ≥5% by weight, preferably ≥10% by weight, especially 10%-60% by weight, more preferably 10%-40% by weight,% by weight based in each case on the overall mixture (M).

In a further preferred embodiment, referred to herein as embodiment (G"), in a departure from the above embodiment (G), water as component (b) is replaced by use of a mixture comprising water and at least one organic solvent, especially as described further down under solvents (see paragraphs "usable solvents", "solvents usable with preference", "solvents usable with particular preference"), at least in a total amount of ≥5% by weight, preferably ≥10% by weight, especially 10%-60% by weight, more preferably 10%-40% by weight,% by weight based in each case on the overall mixture (M).

A further preferred embodiment (H) envisages the combination of embodiment (G) with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-

(dimethylamino)ethoxy)ethyl)(methyl)amino)ethanol, N-(2-(2-(dimethylamino)ethoxy)ethyl)-N-methylpropane-1,3-diamine.

A further preferred embodiment (H') envisages the combination of embodiment (G') with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

A further preferred embodiment (H') envisages the combination of embodiment (G") with an "additional amine catalyst" present in physically separate form, as defined further down, especially in combination with an additional amine catalyst selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

The aforementioned embodiments (H), (H') and (H") thus mean that, in the production of polyurethane systems, firstly, the mixture (M) according to the invention is used in the sense of the aforementioned embodiment (G), (G') or (G") and, at the same time, an additional amine catalyst present in physically separate form, as defined further down, is also used, characterized in that the additional amine catalyst especially catalyses the blow reaction or is described as a blow catalyst according to the prior art, especially selected from the group of 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine.

According to a preferred embodiment of the invention, a mixture (M) usable with preference in accordance with the invention comprises
(a) N,N-dimethylaminopropylamine, at least in an amount of ≥5% by weight, advantageously in an amount of ≥20% by weight, preferably 20%-95% by weight, especially 30%-70% by weight, more preferably 30%-60% by weight,
(b) water, at least in an amount of ≥5% by weight, preferably ≥10% by weight, especially 10%-60% by weight, more preferably 10%-40% by weight, and
(c) at least one amine selected from the group comprising 2-(dimethylamino)ethanol, 2-(diethylamino)ethanol, 1-(2-hydroxyethyl)pyrrolidine, 2-(2-(dimethylamino)ethoxy)ethanol, '2-(2-(diethylamino)ethoxy)ethanol, 2-(2-(pyrrolidin-1-yl)ethoxy)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, N,N,N',N'-tetramethyl-1,6-hexanediamine, 2-((2-(dimethylamino)ethyl)(methyl)amino)ethanol, 2-((2-(2-(dimethylamino)ethoxy)ethyl)(methyl)amino)ethanol, N-(2-(2-(dimethylamino)ethoxy)ethyl)-N-methylpropane-1,3-diamine.
preferably selected from the group comprising 2-(dimethylamino)ethanol, 2-(2-(dimethylamino)ethoxy)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, N,N,N',N'-tetramethyl-1,6-hexanediamine, 2-((2-(2-(dimethylamino)ethoxy)ethyl)(methyl)amino)ethanol, N-(2-(2-(dimethylamino)ethoxy)ethyl)-N-methylpropane-1,3-diamine, more preferably selected from the group comprising 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine, especially preferably selected from the group comprising 2-(dimethylamino)ethanol, bis(2-dimethylaminoethyl) ether, 2-((2-(2-(dimethylamino)ethoxy)ethyl)(methyl)amino)ethanol, N-(2-(2-(dimethylamino)ethoxy)ethyl)-N-methylpropane-1,3-diamine, advantageously in a total amount of ≥5% by weight, preferably 10%-95% by weight, especially 10%-60% by weight,
% by weight based in each case on the overall mixture (M).

In a further preferred embodiment, in a departure from the preferred embodiment just mentioned above, water as component (b) is replaced by use of at least one organic solvent, especially as described further down under solvents (see paragraphs "usable solvents", "solvents usable with preference", "solvents usable with particular preference"), at least in an amount of ≥5% by weight, preferably ≥10% by weight, especially 10%-60% by weight, more preferably 10%-40% by weight,% by weight based in each case on the overall mixture (M). In a further preferred embodiment, in a departure from the preferred embodiment just mentioned above, organic solvent as component (b) is replaced by use of a mixture comprising water and at least one organic solvent, especially as described further down under solvents (see paragraphs "usable solvents", "solvents usable with preference", "solvents usable with particular preference"), at least in a total amount of ≥5% by weight, preferably ≥10% by weight, especially 10%-60% by weight, more preferably 10%-40% by weight,% by weight based in each case on the overall mixture (M).

According to a preferred embodiment of the invention, a mixture (M) usable with preference in accordance with the invention comprises
(a) N,N-dimethylaminopropylamine, at least in an amount of ≥5% by weight, advantageously in an amount of ≥20% by weight, preferably 20%-95% by weight, especially 30%-70% by weight, more preferably 30%-60% by weight,
(b) water, at least in an amount of ≥5% by weight, preferably ≥10% by weight, especially 10%-60% by weight, more preferably 10%-40% by weight, and
(c) at least one amine selected from the group comprising 1,1'-{[3-(dimethylamino)propyl]imino}bis-2-propanol, 3-(diethylaminopropyl)amine, 1-(3-aminopropyl)pyrrolidine, 1,1'-{[3-(dimethylamino)propyl]imino}bis-2-propanol, bis(3-dimethylaminopropyl)amine, bis(3-(pyrrolidin-1-yl)propyl)amine, N,N-bis[3-(dimethylamino)propyl]-N',N'-dimethylpropane-1,3-diamine, tris(3-(pyrrolidin-1-yl)propyl)amine, 1-[bis[3-(dimethylamino)propyl]amino]-2-propanol, N-(3-(dimethylamino)propyl)-N,N,N'-trimethylpropane-1,3-diamine, 2-((3-(dimethylamino)propyl)methylamino)ethanol, 1(-3-(dimethylamino)propyl)urea, 1,3-bis(3-(dimethylamino)propyl)urea, 1,4-diazabicyclo[2.2.2]octane and/or 1,4-diazabicyclo-[2.2.2]octane-2-methanol, 2-(dimethylamino)ethanol, 2-(diethylamino ethanol, 1-(2-hydroxyethyl)pyrrolidine, 2-(2-(dimethylamino)ethoxy)ethanol, '2-(2-(diethylamino)ethoxy)ethanol, 2-(2-(pyrrolidin-1-yl)ethoxy)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, N,N,N',N'-tetramethyl-1,6-hexanediamine, 2-((2-(dimethylamino)ethyl)(methyl)amino)ethanol, 2-((2-(2-(dimethylamino)ethoxy)ethyl)(methyl)amino)ethanol, N-(2-(2-(dimethylamino)ethoxy)ethyl)-N-methylpropane-1,3-diamine, 1,1,3,3-tetramethylguanidine, 1,5,7-triazabicyclo[4.4.0]dec-5-ene, 2,2,4-trimethyl-1-oxa-4-aza-2-silacyclohexane and/or 4-ethyl-2,2-dimethyl-1-oxa-4-aza-2-silacyclohexane, preferably selected from the group comprising 1,1'-{[3-(dimethylamino)propyl]imino}bis-2-propanol, bis(3-dimethylaminopropyl)amine, 1-[bis[3-(dimethylamino)propyl]amino]-2-propanol, 1,4-diazabicyclo[2.2.2]octane, 2-(dimethylamino)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, 2-((2-(2-(dimethylamino)ethoxy)ethyl)(methyl)amino)ethanol, N-(2-(2-(dimethylamino)ethoxy)ethyl)-N-methylpropane-1,3-diamine, 1,1,3,3-tetramethylguanidine, 1,5,7-triazabicyclo[4.4.0]dec-5-ene, 2,2,4-trimethyl-1-oxa-4-aza-2-silacyclohexane and/or 4-ethyl-2,2-dimethyl-1-oxa-4-aza-2-silacyclohexane, more preferably selected from the group comprising 1,1'-{[3-(dimethylamino)propyl]imino}bis-2-propanol, bis(3-dimethylaminopropyl)amine, 1-[bis[3-(dimethylamino)propyl]amino]-2-propanol, 2-(dimethylamino)ethanol, bis(2-dimethylaminoethyl) ether, 2-((2-(2-(dimethylamino)ethoxy)ethyl)(methyl)amino)ethanol, N-(2-(2-(dimethylamino)ethoxy)ethyl)-N-methylpropane-1,3-diamine, 1,1,3,3-tetramethylguanidine, 1,5,7-triazabicyclo[4.4.0]dec-5-ene, 2,2,4-trimethyl-1-oxa-4-aza-2-silacyclohexane and/or 4-ethyl-2,2-dimethyl-1-oxa-4-aza-2-silacyclohexane, especially preferably selected from the group comprising 1,1'-{[3-(dimethylamino)propyl]imino}bis-2-propanol, bis(3-dimethylaminopropyl)amine and/or 1-[bis[3-(dimethylamino)propyl]amino]-2-propanol, advantageously in a total amount of ≥5% by weight, preferably 20%-95% by weight, especially 20%-60% by weight, % by weight based in each case on the overall mixture (M).

In a further preferred embodiment, in a departure from the preferred embodiment just mentioned above, water as component (b) is replaced by use of at least one organic solvent, especially as described further down under solvents (see paragraphs "usable solvents", "solvents usable with preference", "solvents usable with particular preference"), at least in an amount of ≥5% by weight, preferably ≥10% by weight, especially 10%-60% by weight, more preferably 10%-40% by weight,% by weight based in each case on the overall mixture (M). In a further preferred embodiment, in a departure from the preferred embodiment just mentioned above, organic solvent as component (b) is replaced by use of a mixture comprising water and at least one organic solvent, especially as described further down under solvents (see paragraphs "usable solvents", "solvents usable with preference", "solvents usable with particular preference"), at least in a total amount of ≥5% by weight, preferably ≥10% by weight, especially 10%-60% by weight, more preferably 10%-40% by weight,% by weight based in each case on the overall mixture (M).

Preferably, the mixtures (M) according to the invention are used as catalysts in the inventive production of polyurethane systems, preferably for production of polyurethane coatings, polyurethane adhesives, polyurethane sealants, polyurethane elastomers, or especially for production of polyurethane foams. The mixtures (M) according to the invention may be used to supplement standard catalysts or as a substitute for standard catalysts. More particularly, the mixtures (M) according to the invention can be used as a substitute for other nitrogen-containing catalysts (amine catalysts or amines), and, according to the application, as a partial or full substitute for standard metallic catalysts according to the prior art.

It will be appreciated that the person skilled in the art, in order to produce the different polyurethane systems, especially the different polyurethane foam types, for example hot-cure, cold-cure or ester-type flexible polyurethane foams or rigid polyurethane foams, will accordingly select the substances needed for each of these purposes, such as isocyanates, polyols, stabilizers, surfactants, etc., in order to obtain the polyurethane type, especially polyurethane foam type, desired in each case.

In the inventive production of polyurethane systems, especially of polyurethane foams, in the context of the inventive use, preferably at least one mixture (M) according to the invention, at least one polyol component and at least one isocyanate component are reacted with one another, optionally in the presence of water, physical blowing agents, flame retardants, additional catalysts and/or further additives. The inventive use wherein the production of the polyurethane, especially polyurethane foam, involves providing a composition including at least the mixture (M) and additionally at least one polyol component, at least one isocyanate component and optionally one or more blowing agents, and reaction of this composition, is a preferred embodiment of the invention.

Further details of the usable starting materials, catalysts and auxiliaries and additives can be found, for example, in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives which follow are mentioned merely by way of example and can be replaced and/or supplemented by other substances known to those skilled in the art.

Mixtures (M) according to the invention are used in the context of the invention preferably in a proportion by mass of 0.01 to 20.0 parts (pphp), preferably 0.01 to 5.00 parts and more preferably 0.02 to 3.00 parts based on 100 parts (pphp) of polyol component. The aforementioned proportions by mass of the mixture (M) relate to the nitrogen compounds present therein.

In the context of the present invention, the isocyanate components used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. Generally, it is possible to use all aliphatic, cycloaliphatic, arylaliphatic and preferably aromatic polyfunctional isocyanates known per se. Preferably, isocyanates are used within a range from 60 to 350 mol %, more preferably within a range from 60 to 140 mol %, relative to the sum total of the isocyanate-consuming components.

Specific examples are: alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates, such as cyclohexane 1,3-diisocyanate and 1,4-diisocyanate and also any desired mixtures of these isomers, 1-isocyanato-3,3,5-trimethyl-5-isocyanatomethylcyclohexane (isophorone diisocyanate or IPDI for short), 2,4- and 2,6-hexahydrotolylene diisocyanate and also the corresponding isomeric mixtures, and preferably aromatic di- and polyisocyanates, for example 2,4- and 2,6-tolylene diisocyanate (TDI) and the corresponding isomeric mixtures, mixtures of 2,4'- and 2,2'-diphenylmethane diisocyanates (MDI) and polyphenyl polymethylene polyisocyanates (polymeric MDI) and mixtures of polymeric MDI and tolylene diisocyanates (TDI). Organic di- and polyisocyanates can be used individually or as mixtures thereof.

It is also possible to use isocyanates which have been modified by the incorporation of urethane, uretdione, isocyanurate, allophanate and other groups, called modified isocyanates.

Particularly suitable organic polyisocyanates, and so used with particular preference, are various isomers of tolylene diisocyanate (2,4- and 2,6-tolylene diisocyanate (TDI), in pure form or as isomeric mixtures differing in composition), 4,4'-diphenylmethane diisocyanate (MDI), the so-called "crude MDI" or "polymeric MDI" (contains the 2,4'- and 2,2'-isomers of MDI as well as the 4,4'-isomer and also more highly nuclear products), and also the binuclear product to which the designation "pure MDI" is applied, which consists predominantly of 2,4'- and 4,4'-isomeric mixtures and/or prepolymers thereof. Examples of particularly suitable isocyanates are detailed, for example, in EP 1712578, EP 1161474, WO 00/58383, US 2007/0072951, EP 1678232 and WO 2005/085310, to which reference is made here in full.

Polyols suitable as polyol component for the purposes of the present invention are all organic substances having two or more isocyanate-reactive groups, preferably OH groups, and also formulations thereof. Preferred polyols include any polyether polyols and/or polyester polyols and/or hydroxyl-containing aliphatic polycarbonates, in particular polyether polycarbonate polyols and/or natural oil-based polyols (NOPs) that are typically used for production of polyurethane systems, in particular foamed polyurethane materials. Typically, the polyols have a functionality of 1.8 to 8 and number-average molecular weights in the range from 500 to 15 000. Typically, the polyols having OH numbers in the range from 10 to 1200 mg KOH/g are used. The number-average molecular weights are typically determined by gel permeation chromatography (GPC), especially with polypropylene glycol as reference substance and tetrahydrofuran (THF) as eluent. The OH numbers can especially be determined to DIN standard DIN 53240:1971-12.

Polyether polyols are obtainable by known methods, for example by anionic polymerization of alkylene oxides in the presence of alkali metal hydroxides, alkali metal alkoxides or amines as catalysts and by addition of at least one starter molecule, which preferably contains 2 or 3 reactive hydrogen atoms in bonded form, or by cationic polymerization of alkylene oxides in the presence of Lewis acids such as, for example, antimony pentachloride or boron trifluoride etherate, or by double metal cyanide catalysis. Suitable alkylene oxides contain from 2 to 4 carbon atoms in the alkylene moiety. Examples are tetrahydrofuran, 1,3-propylene oxide, 1,2-butylene oxide and 2,3-butylene oxide; ethylene oxide and 1,2-propylene oxide are preferably used. The alkylene oxides can be used individually, cumulatively, in blocks, in alternation or as mixtures. Starter molecules used may especially be compounds having at least 2, preferably 2 to 8, hydroxyl groups, or having at least two primary amino groups in the molecule. Starter molecules used may, for example, be water, di-, tri- or tetrahydric alcohols such as ethylene glycol, propane-1,2- and -1,3-diol, diethylene glycol, dipropylene glycol, glycerol, trimethylolpropane, pentaerythritol, castor oil, etc., higher polyfunctional polyols, especially sugar compounds, for example glucose, sorbitol, mannitol and sucrose, polyhydric phenols, resols, for example oligomeric condensation products of phenol and formaldehyde and Mannich condensates of phenols, formaldehyde and dialkanolamines, and also melamine, or amines such as aniline, EDA, TDA, MDA and PMDA, more preferably TDA and PMDA. The choice of the suitable starter molecule depends on the particular field of use of the resulting polyether polyol in the polyurethane production (for example, polyols used for production of flexible polyurethane foams are different from those used in the production of rigid polyurethane foams).

Polyester polyols are based on esters of polybasic aliphatic or aromatic carboxylic acids, preferably having 2 to 12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. The polyester polyols are obtained by condensation of these polybasic carboxylic acids with polyhydric alcohols, preferably of diols or triols having 2 to 12, more preferably having 2 to 6, carbon atoms, preferably trimethylolpropane and glycerol.

Polyether polycarbonate polyols are polyols containing carbon dioxide in the bonded form of the carbonate. Since carbon dioxide forms as a by-product in large volumes in many processes in the chemical industry, the use of carbon dioxide as comonomer in alkylene oxide polymerizations is of particular interest from a commercial point of view. Partial replacement of alkylene oxides in polyols with carbon dioxide has the potential to distinctly lower the costs for the production of polyols. Moreover, the use of $CO_2$ as comonomer is very advantageous in environmental terms, since this reaction constitutes the conversion of a greenhouse gas to a polymer. The preparation of polyether polycarbonate polyols by addition of alkylene oxides and carbon dioxide onto H-functional starter substances by use of catalysts is well known. Various catalyst systems can be used here: The first generation was that of heterogeneous zinc or aluminium salts, as described, for example, in U.S. Pat. Nos. 3,900,424 or 3,953,383. In addition, mono- and binuclear metal complexes have been used successfully for copolymerization of CO2 and alkylene oxides (WO 2010/028362, WO 2009/130470, WO 2013/022932 or WO 2011/163133). The most important class of catalyst systems for the copolymerization of carbon dioxide and alkylene oxides is that of double metal cyanide catalysts, also referred to as DMC catalysts (U.S. Pat. No. 4,500,704, WO 2008/058913). Suitable alkylene oxides and H-functional starter substances are those also used for preparing carbonate-free polyether polyols, as described above.

Polyols based on renewable raw materials, natural oil-based polyols (NOPs), for production of polyurethane foams are of increasing interest with regard to the long-term limits in the availability of fossil resources, namely oil, coal and gas, and against the background of rising crude oil prices, and have already been described many times in such applications (WO 2005/033167; US 2006/0293400, WO 2006/094227, WO 2004/096882, US 2002/0103091, WO 2006/116456 and EP 1678232). A number of these polyols are now available on the market from various manufacturers (WO 2004/020497, US 2006/0229375, WO 2009/058367). Depending on the base raw material (e.g. soya bean oil, palm oil or castor oil) and the subsequent workup, polyols having a different profile of properties are the result. It is possible here to distinguish essentially between two groups: a) polyols based on renewable raw materials which are modified such that they can be used to an extent of 100% for production of polyurethanes (WO 2004/020497, US 2006/0229375); b) polyols based on renewable raw materials which, because of the processing and properties thereof, can replace the petrochemical-based polyol only in a certain proportion (WO 2009/058367).

A further class of usable polyols is that of the so-called filled polyols (polymer polyols). A feature of these is that they contain dispersed solid organic fillers up to a solids content of 40% or more. SAN, PUD and PIPA polyols are among useful polyols. SAN polyols are highly reactive polyols containing a dispersed copolymer based on styrene-acrylonitrile (SAN). PUD polyols are highly reactive polyols containing polyurea, likewise in dispersed form. PIPA polyols are highly reactive polyols containing a dispersed polyurethane, for example formed by in situ reaction of an isocyanate with an alkanolamine in a conventional polyol.

The solids content, which is preferably between 5% and 40%, based on the polyol, depending on the application, is responsible for improved cell opening, and so the polyol can be foamed in a controlled fashion, especially with TDI, and no shrinkage of the foams occurs. The solids content thus acts as an essential processing aid. A further function is to control the hardness via the solids content, since higher solids contents bring about a greater hardness on the part of the foam. The formulations with solids-containing polyols have distinctly lower intrinsic stability and therefore tend also to additionally require physical stabilization in addition to the chemical stabilization due to the crosslinking reaction. Depending on the solids contents of the polyols, these can be used for example alone or for example in a blend with the abovementioned unfilled polyols.

A further class of usable polyols is that of those which are obtained as prepolymers by reaction of polyol with isocyanate in a molar ratio of 100:1 to 5:1, preferably 50:1 to 10:1. Such prepolymers are preferably made up in the form of a solution in polymer, and the polyol preferably corresponds to the polyol used for preparing the prepolymers.

A further class of useful polyols is that of the so-called autocatalytic polyols, in particular autocatalytic polyether polyols. Polyols of this kind are based, for example, on polyether blocks, preferably on ethylene oxide and/or propylene oxide blocks, and additionally include catalytically active functional groups, for example nitrogen-containing functional groups, especially amino groups, preferably tertiary amine functions, urea groups and/or heterocycles containing nitrogen atoms. Through the use of such autocatalytic polyols in the production of polyurethane systems, especially of polyurethane foams, preferably of flexible polyurethane foams, it is possible, as the case may be, to reduce the required amount of any catalysts used in addition, depending on application, and/or to match it to specific desired foam properties. Suitable polyols are described, for example, in WO 0158976 (A1), WO 2005063841 (A1), WO 0222702 (A1), WO 2006055396 (A1), WO 03029320 (A1), WO 0158976 (A1), U.S. Pat. No. 6,924,321 (B2), U.S. Pat. No. 6,762,274 (B2), EP 2104696 (B1), WO 2004060956 (A1) or WO 2013102053 (A1) and can be purchased, for example, under the Voractiv™ and/or SpecFlex™ Activ trade names from Dow.

Depending on the required properties of the resulting foams, it is possible to use appropriate polyols, as described for example in: US 2007/0072951 A1, WO 2007/111828, US 2007/0238800, U.S. Pat. No. 6,359,022 or WO 96/12759. Further polyols are known to those skilled in the art and can be found, for example, in EP-A-0380993 or U.S. Pat. No. 3,346,557, to which reference is made in full.

One preferred embodiment of the invention, in particular for production of moulded and high-resilience flexible foams, utilizes two- and/or three-functional polyether alcohols having primary hydroxyl groups, preferably above 50%, more preferably above 80%, in particular those having an ethylene oxide block at the chain end. According to the required properties of this embodiment which is preferred in accordance with the invention, especially for production of the abovementioned foams, preference is given to using, as well as the polyether alcohols described here, further polyether alcohols which bear primary hydroxyl groups and are based predominantly on ethylene oxide, especially having a proportion of ethylene oxide blocks of >70%, preferably >90%. All the polyether alcohols described in the context of this preferred embodiment preferably have a functionality of 2 to 8, more preferably 2 to 5, number-average molecular weights in the range from 2500 to 15 000, preferably 4500 to 12 000, and typically OH numbers in the range from 5 to 80 and preferably 20 to 50 mg KOH/g.

A further preferred embodiment of the invention, in particular for production of flexible slabstock foams, utilizes two- and/or three-functional polyether alcohols having secondary hydroxyl groups, preferably above 50%, more preferably above 90%, in particular those having a propylene oxide block or random propylene oxide and ethylene oxide block at the chain end, or those based exclusively on propylene oxide blocks. Such polyether alcohols preferably have a functionality of 2 to 8, more preferably 2 to 4, number-average molecular weights in the range from 500 to 8000, preferably 800 to 5000 and more preferably 2500 to 4500, and typically OH numbers in the range from 10 to 100 and preferably 20 to 60 mg KOH/g.

In a further preferred embodiment of the invention, especially for production of polyurethane foams, preferably of flexible polyurethane foams, preferably for production of moulded and highly elastic flexible foams, autocatalytic polyols as described above are used.

In a further preferred embodiment of the invention, especially for production of flexible polyurethane-polyester foams, polyester alcohols based on diols and/or triols, preferably glycerol and/or trimethylolpropane, and aliphatic carboxylic acids, preferably adipic acid, suberic acid, azelaic acid and/or sebacic acid, are used. Such polyester alcohols preferably have a functionality of 2 to 4, more preferably 2 to 3, number-average molecular weights in the range from 200-4000, preferably 400-3000 and more preferably 600-2500, and typically OH numbers in the range of 10-1000, preferably 20-500 and more preferably 30-300 mg KOH/g.

In a further preferred embodiment of the invention, especially for production of rigid polyisocyanurate (PIR) foams, polyester alcohols based on diols and/or triols, preferably monoethylene glycol, and aromatic carboxylic acids, preferably phthalic acid and/or terephthalic acid, are used. Such polyester alcohols preferably have a functionality of 2 to 4, more preferably 2 to 3, number-average molecular weights in the range from 200-1500, preferably 300-1200 and more preferably 400-1000, and typically OH numbers in the range of 100-500, preferably 150-300 and more preferably 180-250 mg KOH/g.

In a further preferred embodiment of the invention, especially for production of rigid polyurethane foams, di- to octafunctional polyether alcohols are used, having secondary hydroxyl groups, preferably more than 50%, more preferably more than 90%, especially those having a propylene oxide block or random propylene oxide and ethylene oxide block at the chain end, or those based only on propylene oxide blocks. Such polyether alcohols preferably have a functionality of 2 to 8, more preferably 3 to 8, number-average molecular weights in the range from 500 to 2000, preferably 800 to 1200, and typically OH numbers in the range from 100 to 1200, preferably 120 to 700 and more preferably 200 to 600 mg KOH/g. Depending on the properties required of these foams, which are preferable according to the present invention, the use of the polyols described herein is accompanied by the additional use of polyether alcohols as described above with comparatively high number-averaged molecular weights and comparatively low OH numbers, and/or additional polyester polyols, as described above on the basis of aromatic carboxylic acids.

In a further preferred embodiment of the invention, especially for production of viscoelastic polyurethane foams, preference is given to using mixtures of various, preferably two or three, polyfunctional polyester alcohols and/or polyether alcohols. Typically, the polyol combinations used herein consist of a low molecular weight crosslinker polyol, for example a rigid foam polyol, of high functionality (>3) and/or a conventional high molecular weight slabstock flexible foam or HR polyol, and/or a hypersoft polyether polyol having a high fraction of ethylene oxide blocks and having cell-opening properties.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000, preferably 40 to 350, more preferably 70 to 140. An index of 100 represents a molar ratio of 1:1 for the reactive groups. If, as well as the polyol, the reaction mixture includes compounds containing further isocyanate-reactive groups, for example water preferably for production of polyurethane foams, the above-described preferred index ranges likewise apply to the resulting formulations.

According to the application, it may be preferable in accordance with the invention that, as well as the mixtures (M) according to the invention, additional catalysts are used, specifically individually during the foaming or as catalyst combination premixed with the mixtures (M) according to the invention.

The expression "additional catalysts" in the context of this invention especially encompasses the use of compounds which are not present in the mixtures (M) according to the invention and are simultaneously capable of catalysing isocyanate reactions, especially the reactions mentioned hereinafter, and/or are used as catalysts, co-catalysts or activators in the production of polyisocyanate reaction products, especially in the production of polyurethane systems, more preferably in the production of polyurethane foams.

The expression "premixed catalyst combination", also referred to hereinafter as catalyst combination, in the context of this invention especially encompasses finished compositions of mixtures (M) according to the invention comprising additional catalysts, and optionally still further ingredients or additives, for example acids for blocking the amines, emulsifiers, blowing agents, antioxidants, flame retardants, stabilizers and/or siloxanes, preferably polyether siloxanes, and further additives, especially surfactants, biocides, dyes, pigments, fillers, antistatic additives, crosslinkers, thickeners, chain extenders, cell openers and/or fragrances which are already present as such prior to the foaming and need not be added as individual components during the foaming operation.

In the context of this invention, a distinction is made between "further nitrogen compounds" (except for N,N-dimethylaminopropylamine), which may be part of the mixture (M) in the sense of component (c), and "additional amine catalysts" which may be added in the course of foaming, i.e., for example, may be used in the preliminary metered addition of all the components in the mixing head.

The abovementioned "premixed catalyst combination" is mixed upstream of the mixing head, i.e., for example, by the foaming operator in the vat, or it can be provided as a finished product. This "premixed catalyst combination" is accordingly a further blend of the mixture (M), especially with further additives, described by way of example hereinafter.

Thus, as described hereinafter, it is possible for a premixed catalyst combination to include, for example, a metal catalyst, etc.

Additional catalysts used in the context of this invention may, for example, be any catalysts for the isocyanate-polyol (urethane formation) and/or isocyanate-water (amine and carbon dioxide formation) and/or isocyanate dimerization (uretdione formation), isocyanate trimerization (isocyanurate formation), isocyanate-isocyanate with $CO_2$ elimination (carbodiimide formation) and/or isocyanate-amine (urea formation) reactions and/or "secondary" crosslinking reactions such as isocyanurate-urethane (allophanate formation) and/or isocyanate-urea (biuret formation) and/or isocyanate-carbodiimide (uretimide formation).

Suitable additional catalysts for the purposes of the present invention include, for example, substances that catalyse one of the aforementioned reactions, in particular the gel reaction (isocyanate with polyol), the blow reaction (isocyanate with water) and/or the di- or trimerization of the isocyanate. Such catalysts are preferably amines, especially tertiary amines, and ammonium salts, and/or metal compounds.

Suitable "additional amine catalysts" as additional catalysts for the purposes of the present invention are all nitrogen compounds according to the prior art which are not present in the respective mixture (M) according to the invention and which are capable of catalysing one of the abovementioned isocyanate reactions and/or can be used in the production of polyurethanes, especially of polyurethane foams.

The expression "additional amine catalysts" is to be understood for the purposes of this invention as respectively also comprehending the corresponding protonated and/or quaternized compounds and also mixtures thereof.

Examples of suitable additional amine catalysts for the purposes of the present invention are, for example, the amines triethylamine, N,N-dimethylcyclohexylamine, N,N-dicyclohexylmethylamine, N,N-dimethylaminoethylamine, N,N,N',N'-tetramethylethylene-1,2-diamine, N,N,N',N'-tetramethylpropylene-1,3-diamine, N,N,N',N'-tetramethyl-1,4-butanediamine, 1-(2-aminoethyl)pyrrolidine, N,N'-dimethylpiperazine, 1,2-dimethylimidazole, N-(2-hydroxypropyl)imidazole, 1-isobutyl-2-methylimidazole, N-(3-aminopropyl)imidazole, N-methylimidazole, N-ethylmorpholine, N-methylmorpholine, N-(2-aminoethyl)morpholine, N-(2-hydroxyethyl)morpholine, 2,2'-dimorpholinodiethyl ether, N,N'-dimethylpiperazine, N-(2-hydroxyethyl)piperazine, N-(2-aminoethyl)piperazine, N,N-dimethylbenzylamine, 3-dimethylamino-1-propanol, 1-(3-hydroxypropyl)pyrrolidine, tris(dimethylaminopropyl)hexahydro-1,3,5-triazine, 1,8-diazabicyclo[5.4.0]undec-7-ene, 1,5-diazabicyclo[4.3.0]non-5-ene, N-methyl-1,5,7-triazabicyclo[4.4.0]dec-5-ene, 1,4,6-triazabicyclo[3.3.0]oct-4-ene, tert-butyl-1,1,3,3-tetramethylguanidine, guanidine, bis-N,N-(dimethylaminoethoxyethyl)isophorone dicarbamate, 3-dimethylamino-N,N-dimethylpropionamide and 2,4,6-tris(dimethylaminomethyl)phenol. Suitable additional amine catalysts according to the prior art can be purchased, for example, from Evonik under the TEGOAMIN® trade name.

Suitable metal compounds as additional catalysts for the purposes of the present invention are all metal compounds according to the prior art which catalyse one of the abovementioned isocyanate reactions and/or can be used for production of polyurethanes, especially of polyurethane foams, alongside the mixtures (M) according to the invention. They may be selected, for example, from the group of the metal-organic or organometallic compounds, metal-organic or organometallic salts, organic metal salts, inorganic metal salts, and from the group of the charged or uncharged metallic coordination compounds, especially the metal chelate complexes.

The expression "metal-organic or organometallic compounds" in the context of this invention especially encompasses the use of metal compounds having a direct carbon-metal bond, also referred to here as metal organyls (e.g. tin organyls) or organometallic compounds (e.g. organotin compounds). The expression "organometallic or metal-organic salts" in the context of this invention especially encompasses the use of metal-organic or organometallic compounds having salt character, i.e. ionic compounds in which either the anion or cation is organometallic in nature (e.g. organotin oxides, organotin chlorides or organotin carboxylates). The expression "organic metal salts" in the context of this invention especially encompasses the use of metal compounds which do not have any direct carbon-metal bond and are simultaneously metal salts, in which either the anion or the cation is an organic compound (e.g. tin(II) carboxylates). The expression "inorganic metal salts" in the context of this invention especially encompasses the use of metal compounds or of metal salts in which neither the anion nor the cation is an organic compound, e.g. metal chlorides (e.g. tin(II) chloride), pure metal oxides (e.g. tin oxides) or mixed metal oxides, i.e. containing a plurality of metals, and/or metal silicates or aluminosilicates. The expression "coordination compound" in the context of this invention especially encompasses the use of metal compounds formed from one or more central particles and one or more ligands, the central particles being charged or uncharged metals (e.g. metal- or tin-amine complexes). The expression "metal-chelate complexes" is to be understood for the purposes of this invention as comprehending in particular the use of metal-containing coordination compounds wherein the ligands have at least two sites for coordinating or binding with the metal centre (e.g. metal- or to be more precise tin-polyamine or metal- or to be more precise tin-polyether complexes).

Suitable metal compounds, especially as defined above, as additional catalysts for the purposes of the present invention may, for example, be selected from all metal compounds containing lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead and/or bismuth, especially sodium, potassium, magnesium, calcium, titanium, zirconium, molybdenum, tungsten, zinc, aluminium, tin and/or bismuth, more preferably tin, bismuth, zinc and/or potassium.

Suitable inorganic salts of metals, in particular as defined above, for use as additional catalysts for the purposes of the present invention are selectable, for example, from the group of salts of inorganic acids such as, for example, hydrochloric acid, carbonic acid, sulphuric acid, nitric acid and phosphoric acid and/or of further halogenated acids. The resulting inorganic metal salts, for example metal chlorides, metal sulphates, metal phosphates, preferably metal chlorides such as tin(II) chloride, can be used in the production of polyurethane systems, especially of polyurethane foams, generally only in combination with other organometallic salts, organic metal salts or nitrogen-containing catalysts, and not as sole catalysts, in pure form or blended in a solvent.

Suitable charged or uncharged metallic coordination compounds, especially the metal chelate complexes, especially as defined above, as additional catalysts for the purposes of the present invention may, for example, be selected from the group of the mono- or polynuclear metal-amine, metal-polyamine, metal-polyether, metal-polyester and/or metal-polyamine-polyether complexes. Such complexes can be formed either in situ during the foaming and/or prior to the foaming, or be used as isolated complexes, in pure form or blended in a solvent. Suitable complexing agents, ligands and/or chelate ligands include, for example, acetylacetone, benzoylacetone, trifluoroacetylacetone, ethyl acetoacetate, salicylaldehyde, salicylaldehyde imine and other Schiff bases, cyclopentanone-2-carboxylate, pyrrolidones, for example N-methyl-2-pyrrolidone, N-ethyl-2-pyrrolidone and polyvinylpyrrolidones (various molar mass distributions), polyethers of various molar masses, cyclic polyethers, for example crown ethers, and diamines and polyamines containing primary, secondary and/or tertiary amines.

Suitable metal-containing coordination compounds include, for example, any metal acetylacetonates such as nickel(II) acetylacetonate, zinc(II) acetylacetonate, copper (II) acetylacetonate, molybdenum dioxoacetylacetonate, any iron acetylacetonates, any cobalt acetylacetonates, any zirconium acetylacetonates, any titanium acetylacetonates, any bismuth acetylacetonates and any tin acetylacetonates.

Suitable organometallic salts and organic metal salts, especially as defined above, as additional catalysts for the purposes of the present invention may be selected, for example, from the group of the salts of organic acids.

The expression "organic acids" in the context of this invention encompasses all organochemical, i.e. carbon-containing, compounds having a functional group which can enter into an equilibrium reaction with water and other protonatable solvents in the manner of an acid-base reaction.

Suitable organic acids may be selected, for example, from the group of carboxylic acids, i.e. organic compounds bearing one or more carboxyl groups (*—COOH), called carboxylates, and/or of alcohols, i.e. organic compounds bearing one or more hydroxyl groups (*—OH), called alkoxides, and/or of thiols, i.e. organic compounds bearing one or more thiol groups (*—SH, also referred to as mercapto groups in molecules having higher-priority functional groups), called thiolates (or mercaptides), and/or of mercaptoacetic esters as a special case of the thiols, i.e. organic compounds bearing one or more mercaptoacetic ester groups (*—O—CO—

CH$_2$—CH$_2$—SH), called mercaptoacetates, and/or of sulphuric esters, i.e. organic compounds bearing one or more sulphate groups (*—O—SO$_3$H), called sulphates, and/or of sulphonic acids, i.e. organic compounds bearing one or more sulpho groups (*—SO$_2$—OH), called sulphonates, and/or phosphoric esters (alkyl phosphates), i.e. organic compounds which are alkyl mono- or diesters of orthophosphoric acid (*—O—PO(OH)$_2$ or *—O—PO(OR)OH), called phosphates, and/or of phosphonic acids, i.e. organic compounds bearing one or more phosphonic acid groups (*—PO(OH)$_2$), called phosphonates, and/or phosphorous esters, organic compounds which are alkyl esters of phosphonic acid (*—P(OR)$_2$(OH) or *—P(OR)(OH)$_2$), called phosphites.

Suitable carboxylic acids for the purposes of the present invention are, for example, all linear, branched or cyclic, aliphatic or aromatic, saturated or unsaturated mono-, di- or polycarboxylic acids which are optionally substituted by one or more heteroatoms, preferably by hydroxyl groups (*—OH), primary, secondary or tertiary amino groups (*—NH$_2$, *—NHR, *—NR$_2$) or mercapto groups (*—SH), or interrupted by one or more heteroatoms. Particularly suitable in the context of the present invention are carboxylic acids having, bonded to the carbonyl carbon atom thereof, a hydrogen atom or a linear, branched or cyclic, aliphatic, saturated or unsaturated hydrocarbyl radical which is optionally substituted by one or more heteroatoms, preferably by hydroxyl groups (*—OH), primary, secondary or tertiary amino groups (*—NH$_2$, *—NHR, *—NR$_2$) or mercapto groups (*—SH), or interrupted by one or more heteroatoms. Particularly suitable in the context of the present invention are those aliphatic carboxylic acids having, in the 2 position, i.e. on the carbon atom next to the carbonyl function, disubstituted (tertiary) or trisubstituted (quaternary) carbons, or corresponding hydrocarbyl radicals. Preference is given in the context of the present invention to those aliphatic carboxylic acids having, in the 2 position, one or two methyl, ethyl, n-propyl, isopropyl, n-butyl and/or isobutyl branch(es). Particular preference is given in the context of the present invention to those aliphatic carboxylic acids, especially monocarboxylic acids, which, as well as the described branch in the 2 position, have a saturated or unsaturated, linear or branched alkyl chain and are optionally substituted by one or more heteroatoms, preferably by hydroxyl groups (*—OH), primary, secondary or tertiary amino groups (*—NH$_2$, *—NHR, *—NR$_2$) or mercapto groups (*—SH). More particularly, suitable carboxylic acids may be selected from the group of the neo acids or Koch acids.

Examples of suitable mono-, di- and polybasic, saturated and unsaturated substituted and non-substituted carboxylic acids, fatty acids and neo acids and/or Koch acids include carboxylic acids such as formic acid, acetic acid, propionic acid, propionic acids, acrylic acid, butyric acid, isobutyric acid, 2,2-dimethylbutyric acid, valeric acid, isovaleric acid, 2-methylvaleric acid, 2,2-dimethylvaleric acid (isoheptanoic acid), pivalic acid, caproic acid, 2-ethylhexanoic acid (isooctanoic acid), enanoic acid, caprylic acid, pelargonic acid, isononanoic acid, 3,5,5-trimethylhexanoic acid, 2,5,5-trimethylhexanoic acid, 4,5,5-trimethylhexanoic acid, 2,2,4,4-tetramethylpentanoic acid, 6,6-dimethylheptanoic acid, capric acid, neodecanoic acid, 7,7-dimethyloctanoic acid, 2,2-dimethyloctanoic acid, 2,4-dimethyl-2-isopropylpentanoic acid, 2,2,3,5-tetramethylhexanoic acid, 2,2-diethylhexanoic acid, 2,5-dimethyl-2-ethylhexanoic acid, undecanoic acid, lauric acid, tridecanoic acid, neotridecanoic acid, myristic acid, pentadecanoic acid, palmitic acid, margaric acid, stearic acid, oleic acid, linoleic acid, alpha-linolenic acid, phytanic acid, icosenoic acid, erucic acid, ricinoleic acid, vernolic acid, arachidic acid, arachidonic acid, oxalic acid, glycolic acid, glyoxalic acid, malonic acid, lactic acid, citric acid, succinic acid, fumaric acid, maleic acid, malic acid, tartaric acid, glutaric acid, adipic acid, sorbic acid, cinnamic acid, salicylic acid, benzoic acid, terephthalic acid, phthalic acid, isophthalic acid, nicotinic acid, carbamic acid, pyrrolidine-2-carboxylic acid and cyclohexanecarboxylic acid.

Suitable alcohols are all linear, branched or cyclic, aliphatic or aromatic, saturated or unsaturated monohydric alcohols, dihydric alcohols (diols) and/or polyhydric alcohols (polyols) which are optionally substituted by one or more heteroatoms, preferably by primary, secondary or tertiary amino groups (*—NH$_2$, *—NHR, *—NR$_2$) or mercapto groups (*—SH), or interrupted by one or more heteroatoms. Suitable examples for this purpose are methanol, ethanol, propanol, isopropanol, butanol, tert-butanol, neopentyl alcohol, phenols and/or nonylphenol.

Suitable thiols, mercaptoacetic esters, sulphuric esters, sulphonic acids, phosphoric esters (alkyl phosphates), phosphonic acids and/or phosphorous esters include, for example, any linear, branched or cyclic, aliphatic or aromatic, saturated or unsaturated organic compounds comprising one or more corresponding functional groups as defined above and optionally substituted with one or more heteroatoms or interrupted by one or more heteroatoms. Suitable examples for this purpose are dialkyl phosphites, methanesulphonic acid, trifluoromethanesulphonic acid, p-toluenesulphonic acid, dodecylbenzenesulphonic acid, taurine, isooctyl mercaptoacetate, 2-ethylhexyl mercaptoacetate, ethanethiol and/or n-lauryl mercaptide.

Particularly suitable organometallic salts and organic metal salts as defined above, as additional catalysts for the purposes of the present invention, are, for example, organotin, tin, zinc, bismuth and potassium salts, especially corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis-n-laurylmercaptide, dimethyltin bis-n-laurylmercaptide, monomethyltin tris-2-ethylhexylmercaptoacetate, dimethyltin bis-2-ethylhexylmercaptoacetate, dibutyltin bis-2-ethylhexylmercaptoacetate, dioctyltin bisisooctylmercaptoacetate, tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate.

In the inventive production of polyurethanes, according to the manner of use, especially in the production of polyurethane foams, it may be preferable to rule out the use of organometallic salts, for example dibutyltin dilaurate.

Suitable additional metallic catalysts are generally and preferably selected such that they do not have any troublesome intrinsic odor and are essentially toxicologically safe, and such that the resulting polyurethane systems, especially polyurethane foams, have a minimum level of catalyst-related emissions.

Aside from additional amine catalysts and metal compounds as additional catalysts, it is also possible to use ammonium salts as additional catalysts. Suitable examples are ammonium formate and/or ammonium acetate.

Suitable additional catalysts are mentioned, for example, in DE 102007046860, EP 1985642, EP 1985644, EP 1977825, US 2008/0234402, EP 0656382 B1 and US 2007/0282026 A1, and the patent specifications cited therein.

Suitable use amounts of additional catalysts are guided by the type of catalyst and are preferably in the range from 0.01 to 10.0 pphp, more preferably in the range from 0.02 to 5.00 pphp (=parts by weight based on 100 parts by weight of polyol) or 0.10 to 10.0 pphp for potassium salts.

According to a preferred embodiment of the invention, especially for production of mouldable and high-elasticity flexible foams and for production of polyurethanes used in the automobile industry, it may be preferable that the use of metallic catalysts is dispensed with and that the catalysts used are exclusively mixtures (M) according to the invention, optionally in combination with additional amine catalysts, more preferably in the sense of the above-described preferred embodiments (B), (B'), (B") (D), (D'), (D") (F), (F'), (F'''), (H), (H') and/or (H").

"That the use of metallic catalysts is dispensed with" means that, in the preparation of polyurethanes in question, ≥0.001% by weight to ≤20% by weight, preferably <10% by weight, more preferably <5% by weight and especially preferably <1% by weight of metallic catalysts may be used, but the use of metallic catalysts is especially dispensed with entirely.

If additional metallic catalysts, especially tin catalysts, should be used alongside the mixture (M) according to the invention, which corresponds to another preferred embodiment, it may be preferable according to the application when the sum total of all the nitrogen compounds used, i.e. the sum total of the nitrogen compounds in mixtures (M) according to the invention and the additional amine catalysts according to the prior art, relative to the sum total of the metallic catalysts, especially potassium, zinc and tin catalysts, results in a molar ratio of 1:0.05 to 0.05:1, preferably 1:0.07 to 0.07:1 and more preferably 1:0.1 to 0.1:1.

In order to prevent any reaction of the components with one another, especially reactions of mixtures (M) used in accordance with the invention and optionally additional amine catalysts with additional metallic catalysts, especially potassium, zinc and/or tin catalysts, it may be preferable to store these components separately from one another and then to feed in the isocyanate and polyol reaction mixture simultaneously or successively.

In a preferred embodiment of the invention, in the context of the inventive use, a mixture (M) according to the invention is used in combination with a) one or more additional amine catalysts (i.e. other than N,N-dimethylaminopropylamine and other than component (c) of the mixture (M) according to the invention) as additional catalysts, preferably as defined and described by way of example above, b) one or more metallic catalysts, especially one or more tin, zinc, bismuth and/or potassium compounds, preferably as defined and described by way of example above, c) one or more acids to block the amines present, preferably as described above, d) one or more chemical or physical blowing agents, preferably as described hereinbelow, e) one or more stabilizers against oxidative degradation, for example antioxidants, preferably as described hereinbelow, f) one or more flame retardants, preferably as described hereinbelow, and/or g) one or more foam stabilizers based on siloxanes and/or polydialkylsiloxane-polyoxyalkylene copolymers, preferably as defined and described hereinbelow, and/or h) one or more further added substances, for example as selected from the group of surfactants, biocides, dyes, pigments, fillers, antistats, crosslinkers, thickeners, chain extenders, cell openers and/or fragrances, wherein the production of the polyurethane, especially the polyurethane foam, is advantageously preceded by initial production of a composition, for example in the manner of pre-dosage of the individual components in the mixing head or, for example, as a premixed catalyst combination, especially as defined above, comprising the aforementioned combination.

In the context of the aforementioned preferred embodiment, particularly preferred combinations in the context of the present invention are those compositions in which at least one mixture (M) according to the invention is used in combination with a), with b), with c), with d), with e), with f), with g), with h), with a), b), c), d) e), g) and h), with a) and b), with a) and c), with a), b) and c), with a), b) and d), with a), b) and e), with a), b) and f), with a), b) and g), with a), b) and h), with a), b), d) and h), with a), b), d), e) and h), with a), b), e) and h), with a), c) and d), with a), c) and h), with a), c), d) and e), with b), c), d) and e), with b), c), e) and f), with b), c), d), e), f), with b) and d), with b) and e), with b), d) and e), with b), d) and f), with b), e) and f), with b), d), e) and f), or with b), d), e), f) and h).

Usable solvents are all substances suitable according to the prior art. According to the application, it is possible to use aprotic nonpolar, aprotic polar and protic solvents. Suitable aprotic nonpolar solvents are selectable for example from the following classes of substances and/or substance classes comprising the following functional groups: aromatic hydrocarbons, aliphatic hydrocarbons (alkanes (paraffins) and olefins), carboxylic esters and polyesters, (poly) ethers and/or halogenated hydrocarbons of low polarity. Suitable aprotic polar solvents are selectable for example from the following classes of substances or substance classes comprising the following functional groups: ketones, lactones, lactams, nitriles, carboxamides, sulphoxides and/or sulphones. Suitable protic solvents are selectable for example from the following classes of substances or substance classes comprising the following functional groups: alcohols, polyols, (poly)alkylene glycols, amines, carboxylic acids, in particular fatty acids and/or primary and secondary amides.

Solvents usable with preference are, for example, mineral oils, hexane, pentane, heptane, decane or mixtures of saturated hydrocarbons, for example Kaydol products from Sonneborn, natural oil components selected from the group consisting of soya bean oil, Lincoln bean oil, Manchurian bean oil, maize oil, safflower oil, palm oil, linseed oil, sesame oil, perilla oil, dehydrated castor oil, olive oil, sunflower oil, rapeseed oil and further related oils or mixtures thereof, glycol ethers such as ethylene glycol dimethyl ether (monoglyme), bis(2-methoxyethyl) ether (diglyme), triethylene glycol dimethyl ether (triglyme), tetraethylene glycol dimethyl ether (tetraglyme), polyester and polyether polyols, polyols based on renewable raw materials (NOPs), end-capped polyethers, preferably dialkyl polyethers having, as alkyl radicals, butyl/methyl, methyl/methyl or butyl/butyl radicals, preferably those obtainable from diol-started polyethers, glycols, glycerol, carboxylic esters, preferably fatty acid esters, for example ethyl acetate and isopropyl myristate, polycarbonates, phthalates, preferably dibutyl phthalate (DBP), dioctyl phthalate (DNOP), diethylhexyl phthalate (DEHP), diisononyl phthalate (DINP), dimethyl phthalate (DMP), diethyl phthalate (DEP), cyclohexanoates, preferably diisononyl cyclohexanoate (DINCH), diisoundecyl phthalate (DIUP).

Solvents usable with particular preference are compounds which can be processed without any problem in the foaming operation and do not adversely affect the properties of the foam. For example, isocyanate-reactive compounds are suitable, since they are incorporated into the polymer matrix by reaction and do not generate any emissions in the foam. Examples are OH-functional compounds such as (poly)alkylene glycols, preferably monoethylene glycol (MEG or EG), diethylene glycol (DEG), triethylene glycol (TEG), 1,2-propylene glycol (PG), dipropylene glycol (DPG), trimethylene glycol (propane-1,3-diol, PDO), tetramethylene glycol (butanediol, BDO), butyl diglycol (BDG), neopentyl glycol, 2-methylpropane-1,3-diol (Ortegol CXT), and also polyethylene glycols (PEGs) or polypropylene glycols (PPGs) having mean molar masses between 100 and 1000, especially methyl-, ethyl-, propyl-, butyl- and hexyl-started PEG and PPG ethers. Particularly preferred OH-functional compounds further include polyethers having average molecular masses of 200 to 4500, in particular 400 to 2000, among these preferably water-, allyl-, butyl- or nonyl-started polyethers, in particular those which are based on propylene oxide (PO) and/or ethylene oxide (EO) blocks.

Useful added-substance materials include any prior art substances used in the manufacture of polyurethanes, in particular in the manufacture of foamed polyurethane materials, for example blowing agents, preferably water to form $CO_2$ and, if necessary, further physical blowing agents, crosslinkers and chain extenders, stabilizers against oxidative degradation (so-called antioxidants), flame retardants, surfactants, biocides, cell-refining additives, cell openers, solid fillers, antistats, nucleators, thickeners, dyes, pigments, color pastes, scents, emulsifiers, buffers and/or additional catalytically active substances, in particular as defined above.

When the polyurethane systems to be produced are polyurethane foams, it may be advantageous to use water as blowing agent. Preference is given to using a sufficient amount of water that the amount of water is 0.10 to 25.0 pphp (pphp=parts by weight based on 100 parts by weight of polyol).

It is also possible to use suitable physical blowing agents. These are, for example, liquefied $CO_2$, and volatile liquids, for example hydrocarbons of 3, 4 or 5 carbon atoms, preferably cyclo-, iso- and n-pentane, hydrofluorocarbons, preferably HFC 245fa, HFC 134a and HFC 365mfc, hydrochlorofluorocarbons, preferably HCFC 141b, hydrofluoroolefins (HFO) or hydrohaloolefins, for example 1234ze, 1233zd(E) or 1336mzz, oxygen compounds such as methyl formate, acetone and dimethoxymethane, or hydrochlorocarbons, preferably dichloromethane and 1,2-dichloroethane.

In addition to water and the physical blowing agents, it is also possible to use other chemical blowing agents which react with isocyanates to evolve a gas, an example being formic acid.

Crosslinkers and chain extenders refer to low molecular weight polyfunctional compounds that are reactive toward isocyanates. Suitable examples are hydroxyl- or amine-terminated substances such as glycerol, neopentyl glycol, 2-methylpropane-1,3-diol, triethanolamine (TEOA), diethanolamine (DEOA) and trimethylolpropane. The use concentration is typically between 0.1 and 5 parts, based on 100 parts polyol, but may also differ therefrom according to the formulation. When crude MDI is used, it likewise assumes a crosslinking function in the foam-in-place operation. The level of low molecular weight crosslinkers is accordingly reducible in proportion to the increasing amount of crude MDI.

Suitable stabilizers against oxidative degradation, known as antioxidants, preferably include all common free-radical scavengers, peroxide scavengers, UV absorbers, light stabilizers, complexing agents for metal ion impurities (metal deactivators). It is preferable to use compounds of the following classes of substances and/or substance classes comprising the following functional groups, wherein substituents on the respective core structures are particularly preferably those that have isocyanate-reactive groups: 2-(2'-hydroxyphenyl)benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamines, alkyl and aryl phosphites, sulphides, zinc carboxylates, diketones. Useful phenols include, for example, esters based on 3-(4-hydroxyphenyl)propionic acid such as triethylene glycol bis[3-(3-tert-butyl-4-hydroxy-5-methylphenyl)propionate], octadecyl 3-(3,5-di-tert-butyl-4-hydroxyphenyl)propionate, or methylenediphenols such as 4,4'-butylidenebis(6-tert-butyl -3-methylphenol). Preferred 2-(2'-hydroxyphenyl)benzotriazoles are, for example, 2-(2'-hydroxy-5'-methylphenyl)benzotriazole or 2-(2'-hydroxy-3',5'-di-tert-butylphenyl)benzotriazole. Preferred 2-hydroxybenzophenones are, for example, 2-hydroxy-4-n-octoxybenzophenone, 2,2',4,4'-tetrahydroxybenzophenone or 2,4-dihydroxybenzophenone. Preferred benzoates are, for example, hexadecyl 3,5-di-tert-butyl-4-hydroxybenzoate or tannins.

Suitable flame retardants in the context of this invention are all substances which are regarded as suitable for this purpose according to the prior art. Preferred flame retardants are, for example, liquid organophosphorus compounds such as halogen-free organophosphates, e.g. triethyl phosphate (TEP), halogenated phosphates, for example tris(1-chloro-2-propyl) phosphate (TCPP) and tris(2-chloroethyl) phosphate (TCEP), and organic phosphonates, for example dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

Surfactants, which are used especially in the production of polyurethane foams, may be selected, for example, from the group comprising anionic surfactants, cationic surfactants, nonionic surfactants and/or amphoteric surfactants. Surfactants used may, in accordance with the invention, also be polymeric emulsifiers such as polyalkyl polyoxyalkyl polyacrylates, polyvinylpyrrolidones or polyvinyl acetates.

Biocides used may, for example, be commercial products such as chlorophene, benzisothiazoline, hexahydro-1,3,5-tris(hydroxyethyl-s-triazine), chloromethylisothiazoline, methylisothiazoline or 1,6-dihydroxy-2,5-dioxohexane, which are known by the trade names BIT 10, Nipacide BCP, Acticide MBS, Nipacide BK, Nipacide CI, Nipacide FC.

The foam properties of polyurethane foams can be influenced in the course of production thereof especially using siloxanes or organomodified siloxanes, for which it is possible to use the substances known in the prior art. Preference is given to using those compounds that are particularly suitable for the respective foam types (rigid foams, hot-cure flexible foams, viscoelastic foams, ester foams, cold-cure flexible foams (HR foams), semirigid foams). Suitable (organomodified) siloxanes are described for example in the following documents: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds may be prepared as described in the prior art. Suitable examples are described, for instance, in U.S. Pat. No. 4,147,847, EP 0493836 and U.S. Pat. No. 4,855,379.

Useful (foam) stabilizers include any stabilizers known from the prior art. Preference is given to using foam stabilizers based on polydialkylsiloxane-polyoxyalkylene copolymers, as generally used in the production of urethane foams. The structure of these compounds is preferably such that, for example, a long-chain copolymer of ethylene oxide and propylene oxide is bonded to a polydimethylsiloxane radical. The linkage between the polydialkylsiloxane and the polyether moiety may be via an SiC linkage or an Si—O—C bond. In structural terms, the polyether or the different polyethers may be bonded to the polydialkylsiloxane in terminal or lateral positions. The alkyl moiety or the various alkyl moieties therein may be aliphatic, cycloaliphatic or aromatic. Methyl groups are very particularly advantageous. The polydialkylsiloxane may be linear or else contain branches. Suitable stabilizers, especially foam stabilizers, are described inter alia in U.S. Pat. Nos. 2,834,748, 2,917,480 and in 3,629,308. Suitable stabilizers are available from Evonik Industries AG under the trade name TEGOSTAB®.

Suitable siloxanes which can be used in the inventive use of the mixtures (M) according to the invention in the production of polyurethane foams especially have the following structure:

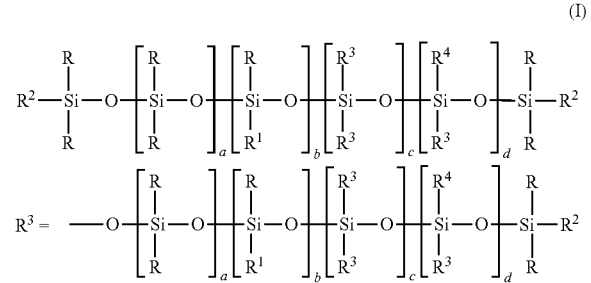
(I)

where
a is independently 0 to 500, preferably 1 to 300 and especially 2 to 150,
b is independently 0 to 60, preferably 1 to 50 and especially 1 to 30,
c is independently 0 to 10, preferably 0 or >0 to 5,
d is independently 0 to 10, preferably 0 or >0 to 5,
with the proviso that, for each molecule of the formula (I), the mean number $\Sigma d$ of T units [$SiR^3R^4O$] and the mean number $\Sigma c$ of Q units [$SiR^3R^3O$] per molecule is not greater than 50 in either case, the mean number $\Sigma a$ of D units [SiRRO] per molecule is not greater than 2000 and the mean number $\Sigma b$ of the siloxy units bearing $R^1$ per molecule is not greater than 100, R is independently at least one radical from the group of linear, cyclic or branched, aliphatic or aromatic, saturated or unsaturated hydrocarbyl radicals having 1 up to 20 carbon atoms, but is preferably a methyl radical, $R^2$ is independently $R^1$ or R, $R^1$ is different from R and is independently an organic radical and/or a polyether radical, $R^1$ preferably being a radical selected from the group of

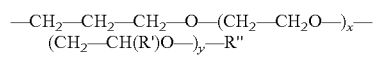

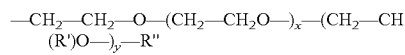

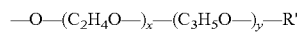

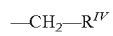

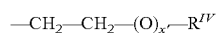

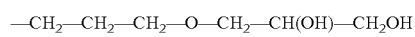

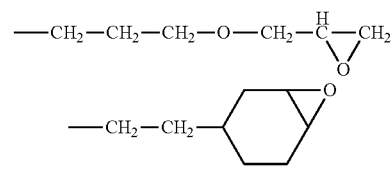

or

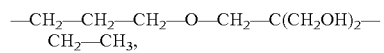

where
x is 0 to 100, preferably >0, especially 1 to 50,
x' is 0 or 1,
y is 0 to 100, preferably >0, especially 1 to 50,
z is 0 to 100, preferably >0, especially 1 to 10,
R' is independently an optionally substituted alkyl or aryl group having 1 to 12 carbon atoms, substituted, for example, by alkyl radicals, aryl radicals or haloalkyl or haloaryl radicals, where different R' substituents may be present within any $R^1$ radical and/or any molecule of the formula (I), and R'' is independently a hydrogen radical or an alkyl group having 1 to 4 carbon atoms, a —C(O)—R''' group with R'''=alkyl radical, a —CH$_2$—O—R' group, an alkylaryl group, for example a benzyl group, the —C(O)NH—R' group, $R^{IV}$ is a linear, cyclic or branched hydrocarbyl radical which also has further substitution, for example substitution by halogens, and has 1 to 50, preferably 9 to 45, more preferably 13 to 37, carbon atoms, $R^4$ may independently be R, $R^1$ and/or a functionalized organic, saturated or unsaturated radical having substitution by heteroatoms, selected from the group of the alkyl, aryl, chloroalkyl, chloroaryl, fluoroalkyl, cyanoalkyl, acryloyloxyaryl, acryloyloxyalkyl, methacryloyloxyalkyl, methacryloyloxypropyl and vinyl radical, with the proviso that at least one substituent from $R^1$, $R^2$ and $R^4$ is not R. The various monomer units in the structural units specified in the formulae (siloxane chains and/or polyoxyalkylene chain) may take the form of alternating blocks with any number of blocks in any sequence or be subject to a random distribution. The indices used in the formulae should be regarded as statistical averages.

The siloxanes of the formula (I) can be prepared by known methods, for example the noble metal-catalysed hydrosilylation reaction of compounds containing a double bond with corresponding hydrosiloxanes, as described, for example, in EP 1520870. The document EP 1520870 is hereby incorporated by reference and is considered to form part of the disclosure-content of the present invention.

Useful compounds having at least one double bond per molecule may include, for example, α-olefins, vinyl polyoxyalkylenes and/or allylpolyoxyalkylenes. Preference is given to using vinyl polyoxyalkylenes and/or allyl polyoxyalkylenes. Particularly preferred vinyl polyoxyalkylenes are, for example, vinyl polyoxyalkylenes having a molar mass in the range from 100 g/mol to 8000 g/mol, which may be formed from the monomers propylene oxide, ethylene oxide, butylene oxide and/or styrene oxide in blocks or in random distribution, and which may either be hydroxy-functional or end-capped by a methyl ether function or an acetoxy function. Particularly preferred allyl polyoxyalkylenes are, for example, allyl polyoxyalkylenes having a molar mass in the range from 100 g/mol to 5000 g/mol, which may be formed from the monomers propylene oxide, ethylene oxide, butylene oxide and/or styrene oxide in blocks or in random distribution, and which may either be hydroxy-functional or end-capped by a methyl ether function or an acetoxy function. Particular preference for use as compounds having at least one double bond per molecule is given to the exemplified α-olefins, allyl alcohol, 1-hexenol, vinylpolyoxyalkylenes and/or allylpolyoxyalkylenes and also allyl glycidyl ether and vinylcyclohexene oxide.

Preference is given to using, in the context of the present invention (especially in the context of the inventive use), siloxanes of the formula (I) in which a is independently 1 to 300, b is independently 1 to 50, c is independently 0 to 4, d is independently 0 to 4, with the proviso that, for each molecule of the formula (I), the mean number Σd of T units and the mean number Σc of Q units per molecule is not greater than 20 in either case, the mean number Σa of D units per molecule is not greater than 1500 and the mean number Σb of $R^1$-bearing siloxy units per molecule is not greater than 50.

A particularly preferred embodiment of the present invention (especially in the context of the inventive use) uses siloxanes of the formula (I) in which $R^1$ is independently an organic radical

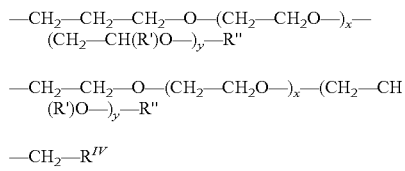

where x is from 0 to 100, preferably >0, in particular from 1 to 50, and y is from 0 to 100, preferably >0, in particular from 1 to 50, and R' in each occurrence is separately the same or different and represents methyl, ethyl and/or phenyl moieties. R" is separately in each occurrence a hydrogen moiety or an alkyl group of 1 to 4 carbon atoms, a —C(O)—R''' group where R'''=alkyl, a —CH2-O—R'$_2$—O—R' group, an alkylaryl group, e.g. a benzyl group, the —C(O) NH—R' group, $R^{IV}$ is a linear, cyclic or branched hydrocarbyl moiety of 1 to 50, preferably 9 to 45, preferably 13 to 37 carbon atoms which is optionally substituted, for example substituted with halogens.

A further preferred embodiment of the present invention (in particular in the context of the use according to the present invention), preferably for production of rigid foams, utilizes siloxanes of formula (I) where $R^1$ is separately in each occurrence an organic moiety selected from the group comprising

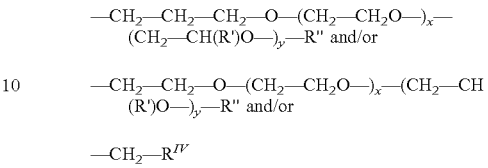

where x is from 0 to 100, preferably >0, in particular from 1 to 50, y is from 0 to 100, preferably >0, in particular from 1 to 50, R' is methyl and R" is separately in each occurrence a hydrogen moiety or an alkyl group of 1 to 4 carbon atoms, a C(O)—R''' group where R'''=alkyl, a —CH2-O—R' group, an alkylaryl group, e.g. a benzyl group, the C(O)NH—R' group, wherein the molar fraction of oxyethylene units comprises at least 70% of the oxyalkylene units, based on the combined amount of oxyalkylene units, i.e. x/(x+y) is >0.7. With this prerequisite, it is preferable that, in addition, the polyoxyalkylene chain bears a hydrogen at its end. When these requirements apply, it is a further preferred embodiment of the invention (in particular in the context of the use according to the invention) to use siloxanes of formula (I) wherein the oxyalkylene units present in $R^1$ are exclusively oxyethylene units and R" is other than hydrogen.

A further preferred embodiment of the present invention (in particular in the context of the use according to the present invention), preferably for production of flexible slabstock foams, utilizes siloxanes of formula (I) where R1 is separately in each occurrence an organic moiety selected from the group comprising

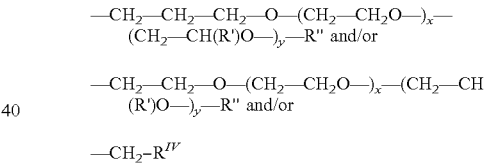

where x is from 0 to 100, preferably >0, in particular from 1 to 50, y is from 0 to 100, preferably >0, in particular from 1 to 50, R' is methyl and R" is separately in each occurrence a hydrogen moiety or an alkyl group of 1 to 4 carbon atoms, a C(O)—R''' group where R'''=alkyl, a —CH2-O—R' group, an alkylaryl group, e.g. a benzyl group, the C(O)NH—R' group, wherein the molar fraction of oxyethylene units comprises at most 60% of the oxyalkylene units, based on the combined amount of oxyalkylene units, i.e. x/(x+y) is <0.6.

A further preferred embodiment of the present invention (in particular in the context of the use according to the present invention) uses siloxanes of formula (I) wherein inter alia olefins are used in the hydrosilylation, as a result of which $R^1$ consists to an extent of not less than 10 mol %, preferably to an extent of not less than 20 mol % and more preferably to an extent of not less than 40 mol % of $CH_2$—$R^{IV}$, where $R^{IV}$ is a linear or branched hydrocarbon of 9 to 17 carbon atoms.

A further preferred embodiment of the present invention (in particular in the context of the use according to the present invention) uses siloxanes of formula (I) wherein the terminal positions (also called the alpha and omega positions) on the siloxane are at least partly functionalized with $R^1$ moieties. In fact, at least 10 mol %, preferably at least 30 mol % and more preferably at least 50 mol % of the terminal positions are functionalized with $R^1$ moieties.

A particularly preferred embodiment of the invention (especially in the context of the inventive use) uses siloxanes of the formula (I) in which a statistical average of not more than 50%, preferably not more than 45%, more preferably not more than 40%, of the total mean molar mass of the siloxane is accounted for by the cumulative molar mass of all the identical or different $R^1$ radicals in the siloxane.

A further preferred embodiment of the present invention (especially in the context of the inventive use) uses siloxanes of the formula (I) in which the R radical is methyl and the structural elements having the index a are present in a greater number than the structural elements having the index b, in such a way that the quotient a/b is at least equal to seven, preferably greater than 10, more preferably greater than 12.

A further preferred embodiment of the present invention (in particular in the context of the use according to the present invention) uses siloxanes of formula (I) where the oxyalkylene units present in $R^1$ are exclusively oxyethylene units and the R" moiety is other than hydrogen.

In a further preferred embodiment of the present invention, it may be preferable in the production of polyurethane foams, especially cold-cure polyurethane foams, to use, as stabilizers, polydimethylsiloxanes of the following general formula (II):

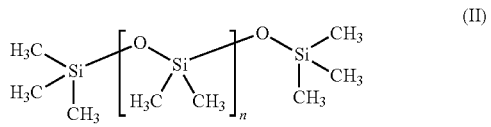

where the proportion of siloxanes with N=(n+2)>9 is higher than 5% by weight and/or that with N>12 is equal to or higher than 2% by weight. In this case, it may be preferable that proportions of siloxanes with N>22 are also present, the proportion thereof being up to 5% by weight. In this case, it may be further preferable that polyols used are polymer polyols alone or in blends with unfilled polyols, the polymer polyols preferably containing dispersed solid organic fillers, and the polyols having a content of primary hydroxyl groups of at least 70%. Polydimethylsiloxanes of the formula (II) usable with preference are described especially in EP 1777252 A1, the teaching of which is hereby fully incorporated by reference. In the context of this invention, it has been found that the combination of mixtures (M) according to the invention with siloxanes of the formula (II) in the context of this invention led to particularly good results in the preparation of polyurethane foams, especially of mouldable and high-elasticity flexible foams.

The siloxanes may also be used, in the context of the present invention (especially in the context of the inventive use), as part of compositions with different carrier media. Useful carrier media include, for example, glycols, for example monoethylene glycol (MEG), diethylene glycol (DEG), propylene glycol (PG) or dipropylene glycol (DPG), alkoxylates or oils of synthetic and/or natural origin.

Preferably, a sufficient amount of the siloxanes of the formula (I) is added to the composition for production of polyurethane systems, preferably of polyurethane foams, that the proportion by mass of compounds of the formula (I) in the finished polyurethane system, preferably the polyurethane foam, is from 0.01% to 10% by weight, preferably from 0.1% to 3% by weight.

It may be advantageous when, in the production of the polyurethane system, a composition including a mixture (M) according to the invention and at least one polyol component, with or without at least one isocyanate component, and optionally one or more blowing agents is produced and/or used, and this composition is reacted. Particular preference is given to using those compositions which include the substances or components for production of polyurethanes, especially polyurethane foams, which have been described above in the context of use.

The present invention further provides for the use of the above-described mixtures (M) according to the invention for production of polyurethanes, especially polyurethane foams, having low emissions, especially low amine emissions, advantageously they are low in emissions in terms of emissions of nitrogen compounds, as also called amine emissions above. With regard to the expression "low amine emissions", reference is made to the preceding description and the elucidations therein, especially test methods. With regard to preferred configurations of this subject-matter, reference is likewise made to the above description, especially to the preferred embodiments mentioned.

The invention further provides for the use of the above-described mixtures (M) according to the invention for production of low-odor polyurethanes, preferably of low-odor polyurethane foams, especially of low-odor flexible polyurethane foams. With regard to the expression "low odor", reference is made to the preceding description and the elucidations therein. With regard to preferred configurations of this subject-matter, reference is likewise made to the above description, especially to the preferred embodiments mentioned.

The invention further provides for the use of the above-described mixtures (M) according to the invention for production of heat-resistant and/or ageing-resistant polyurethane systems, especially polyurethane foams. With regard to the expressions "heat-resistant" and "ageing-resistant", reference is made to the preceding description and the elucidations and test methods therein. With regard to preferred configurations of this subject-matter, reference is likewise made to the above description, especially to the preferred embodiments mentioned.

The present invention further provides for the use of the above-described mixtures (M) according to the invention for production of polyurethane systems, with enablement of better processing, especially in the production of mouldable and high-elasticity flexible foams.

The invention further provides a composition comprising at least one polyol component, wherein the composition includes at least one mixture (M) according to the invention, wherein the composition preferably includes at least one isocyanate component, and wherein the composition optionally comprises additional catalysts, especially further amine catalysts, which are not part of the mixtures (M) according to the invention and/or additional metallic catalysts, especially tin or zinc catalysts, as defined above.

The molar ratio of the total amount of the nitrogen compounds present in the composition according to the invention relative to the total amount of the groups in the polyol component that are reactive with isocyanates is preferably from $4 \times 10^{-4}$:1 to 0.2:1.

Compositions wherein the nitrogen compounds, comprising the nitrogen compounds of mixture (M) and optional additional amine catalysts, are used in a proportion by mass of 0.01 to 20.0 parts (pphp), preferably 0.01 to 5.00 parts and more preferably 0.02 to 3.00 parts based on 100 parts (pphp) of polyol component are a preferred embodiment of the invention.

The inventive composition may additionally include one or more blowing agents as described above. As well as or in place of blowing agents, the inventive composition may include further additions/auxiliaries or additives which are used in the production of polyurethane systems, preferably polyurethane foams. A selection of suitable auxiliaries/additions/additives, for example foam stabilizers or flame retardants, has already been described above for the production of the polyurethane systems, especially the polyurethane foams.

The processing of the inventive compositions to give polyurethane systems, especially polyurethane foams, can be effected by any methods known to the person skilled in the art, for example by manual mixing or preferably with the aid of foaming machines, especially low-pressure or high-pressure foaming machines. The foaming operation can be effected either in the horizontal direction or in the vertical direction. It is possible here to use batch processes, for example for production of moulded foams, refrigerators, automobile seats and panels, or continuous processes, for example in the case of insulation boards, metal composite elements, slabstock foams or in the case of spraying processes. The compositions may be dosed here directly into the mixing chamber or else be admixed upstream of the mixing chamber, to one of the components subsequently arriving in the mixing chamber. The addition can also be effected in the raw material tank. The compositions employed according to the present invention are similarly useful for $CO_2$ technology.

The present invention also provides a polyurethane system obtainable through a use as described above. By means of the use of the mixtures (M) according to the invention, the polyurethane systems according to the invention as described hereinafter are obtainable.

These polyurethane systems of the present invention are preferably polyurethane foams, more preferably rigid polyurethane foams, flexible polyurethane foams, viscoelastic foams, high-resilience (HR) foams, semi-rigid polyurethane foams, thermoformable polyurethane foams or integral foams. The term polyurethane herein is to be understood in turn as a generic term for any polymer obtained from di- or polyisocyanates and polyols or other isocyanate-reactive species, such as amines for example, in that the urethane bond need not be the only or predominant type of bond. Polyisocyanurates and polyureas are also expressly included.

The polyurethane system, in particular polyurethane foam, of the present invention is preferably a rigid polyurethane foam, a flexible polyurethane foam, a viscoelastic foam, a high-resilience (HR) foam, a semi-rigid polyurethane foam, a thermoformable polyurethane foam or an integral foam, wherein the proportion by mass of the mixture (M) in the polyurethane system according to the invention or of the moieties in the finished polyurethane foam which are obtained by their conversion is 0.005% to 10% by weight, more preferably 0.05% to 3% by weight and especially preferably 0.1% to 1% by weight.

In a preferred embodiment, the polyurethane foams according to and/or obtained in accordance with the invention are flexible foams, preferably cold-cure foams, especially mouldable and high-elasticity cold-cure flexible foams.

A preferred composition for producing polyurethane/polyisocyanurate foam within the meaning of the present invention has a foam density of preferably 5 to 800, in particular 5 to 300, more preferably 5 to 150, and still more preferably 10 to 90 kg/m$^3$, and has in particular the following composition:

| component | weight fraction |
|---|---|
| polyol | 100 |
| amine catalyst | 0.05 to 5 |
| metal catalyst | 0.01 to 5 |
| potassium trimerization catalyst | 0 to 10 |
| siloxane | 0.1 to 15, preferably 0.2 to 7 |
| water | 0 to <25, preferably 0.1 to 15 |
| blowing agent | 0 to 130 |
| flame retardant | 0 to 70 |
| fillers | 0 to 150 |
| further additives | 0 to 20 |
| isocyanate index: | greater than 15 |

Amine catalyst in the context of the above composition encompasses the nitrogen compounds present in the mixture (M) according to the invention, especially comprising components (a) and (c) plus any additional amine catalysts which are usable optionally and are not part of components (a) and (c).

The invention further provides for the use of polyurethane systems, especially of polyurethane foams as described above, as refrigerator insulation, insulation panel, sandwich element, pipe insulation, spray foam, 1- and 1.5-component can foam, imitation wood, modelling foam, floral foam, packaging foam, mattress, furniture cushion, mouldable foam for furniture, pillows, rebonded foam, sponge foam, automobile seat cushion, headrest, dashboard, automobile interior, automobile roof liner, sound absorption material, steering wheel, shoe sole, carpet backing foam, filter foam, sealing foam, sealant and adhesive, or for production of corresponding products.

The examples adduced below illustrate the present invention by way of example, without any intention of restricting the invention, the scope of application of which is apparent from the entirety of the description and the claims, to the embodiments specified in the examples.

EXAMPLES

The foaming experiments adduced by way of example hereinafter are intended to illustrate the present invention. The mixture according to the invention referred to hereinafter as amine mixture (I) shall serve as an example of the mixtures (M) according to the invention, said mixture consisting of N,N-dimethylaminopropylamine (50% by weight), 1,1'-{[3-(dimethylamino)propyl]imino}bis-2-propanol (10% by weight), bis(3-dimethylaminopropyl)amine (10% by weight) and water (30% by weight). The amine mixture (I) has a flashpoint >60° C., determined by the Pensky-Martens method with a closed crucible in accordance with DIN EN ISO 2719:2003-09, in accordance with test method A therein using a Pensky-Martens 4 measuring instrument. For all formulations containing additional water, the proportion by mass of water in the amine mixture (I) was taken into account and, according to the formulation chosen, either the amount of additional water or the amine mixture (I) was adjusted correspondingly.

Rigid Foam—Foaming Examples

Example 1

Production of Rigid Polyurethane Foams, for Example for Use in the Insulation of Refrigerating Appliances For the performance testing of the mixtures (M) according to the invention containing nitrogen compounds, the foam formulation specified in Table 1 was used.

TABLE 1

Formulation 1 for rigid foam applications

| Formulation 1 | Parts by mass (pphp) |
|---|---|
| Polyol 1[1)] | 100 parts |
| Water[4)] | 2.60 parts |
| Cyclopentane | 13.1 parts |
| Amine catalyst[4)] | 1.50 parts |
| TEGOSTAB ® B 8460[2)] | 1.50 parts |
| Desmodur ® 44V20L[3)] | 198.5 parts |

[1)]Polyol 1: sorbitol/glycerol-based polyether polyol having an OH number of 471 mgKOH/g.
[2)]Polyether-modified polysiloxane.
[3)]Polymeric MDI from Bayer, 200 mPa * s, 31.5% NCO, functionality 2.7.
[4)]Amount of water adjusted correspondingly on use of amine mixture (I).

The foams were produced by manual mixing. The formulations as specified in Table 1 with various amine catalysts were used. For this purpose, polyol 1, a conventional amine catalyst or the amine mixture (I) according to the invention, water, foam stabilizer and blowing agent were weighed into a cup and mixed with a disc stirrer of diameter 6 cm at 1000 rpm for 30 seconds. The blowing agent quantity which had evaporated during the mixing operation was determined by reweighing and replenished. Now the isocyanate (MDI) was added, and the reaction mixture was stirred with the stirrer described at 3000 rpm for 5 s and transferred immediately into a paper-lined box (base area 27 cm×14 cm and height 14 cm). To assess the catalytic properties, the following characteristic parameters were determined: cream time, gel time (fiber time), rise time and tack-free time.

The results from evaluating the catalytic properties of the amine mixture (I) according to the invention are collated in Table 2. Comparative catalysts according to the prior art used were N,N-dimethylcyclohexylamine (DMCHA), dimethylaminoethoxyethanol (DMEE) and 1,1'-{[3-(dimethylamino)propyl]imino}bis-2-propanol (TEGOAMIN® ZE 1, available from Evonik Industries).

TABLE 2

Results of the foaming operations on formulation 1 (Table 1)

| Amine catalyst | Cream time [s][1)] | Gel time [s][1)] | Rise time [s][1)] | Tack-free time [s][1)] |
|---|---|---|---|---|
| DMCHA | 38 | 148 | 293 | 315 |
| DMEE | 31 | 154 | 272 | 303 |
| TEGOAMIN ® ZE 1 | 40 | 243 | 325 | 415 |
| Amine mixture (I) | 38 | 210 | 301 | 395 |

[1)]time figures in seconds [s].

As can be inferred from Table 2, the amine mixture (I) showed good catalytic activity in the rigid polyurethane foam application chosen. The amine mixture (I) had a higher catalytic activity than TEGOAMIN® ZE 1. With regard to the selectivity, the amine mixture (I) exhibited a similar profile to TEGOAMIN® ZE 1, but stronger activity and an increased selectivity for the gel reaction, which is apparent from the lower gel time in each case.

Flexible Foam—Performance Tests

Physical properties of flexible polyurethane foams:

The flexible polyurethane foams produced were assessed using the following physical properties:
a) Foam settling at the end of the rise period: The fall-back, or the further rise, is found from the difference in the foam height after direct blow-off and after 3 minutes after foam blow-off. The foam height is measured at the maximum in the middle of the foam crest by means of a needle secured to a centimetre scale. A positive value here describes the settling of the foam after blow-off; a negative value correspondingly describes the further rise of the foam.
b) Foam height: The final height of the foam is determined by subtracting the fall-back from or adding the further rise to the foam height after blow-off. Foam height is reported in centimetres (cm).
c) Compression force deflection CFD, 40% to DIN EN ISO 3386-1:2010-09. The measured values are reported in kilopascals (kPa).
d) Compression set, 50% to DIN EN ISO 1856:2008-01.
e) Humid ageing to DIN EN ISO 2440:2000-01.

Measurement of foam emissions (VOC and fog value) in accordance with test method VDA 278 in the version dated October 2011:

The method serves to determine emissions from non-metallic materials used for moulded parts in motor vehicles. The emission of volatile organic compounds (VOC value, 30 minutes at 90° C.) and the proportion of condensable substances (fog value, 60 minutes at 120° C.), especially of the catalysis-related emissions, the emissions of the individual constituents of inventive catalyst combinations or the breakdown or conversion products thereof, were determined in accordance with test method VDA 278 in the version dated October 2011. There follows a description of the procedure for the corresponding thermal desorption with subsequent gas chromatography-mass spectrometry coupling (GC-MS).
a) Measurement technique: The thermal desorption was conducted with a "TDS2" thermal desorber with autosampler from Gerstel, Müllheim, in conjunction with an Agilent 7890/5975 GC/MSD system.
b) Measurement conditions for VOC measurements are reported in Tables 3 and 4.

TABLE 3

Thermal desorption analysis parameters for the VOC analysis run

| Thermal desorption | Gerstel TDS2 |
|---|---|
| Desorption temperature | 90° C. |
| Desorption time | 30 min |
| Flow rate | 65 ml/min |
| Transfer line | 280° C. |
| Cryofocusing | KAS 4 |
| Liner | glass evaporator tube with silanized glass wool |
| Temperature | −150° C. |

TABLE 4

Gas chromatography-mass spectrometry analysis parameters for the VOC analysis run

| GC | capillary - GC Agilent 7890 |
|---|---|
| Injector | PTV split 1:50 |
| Temperature programme | −150° C.; 1 min; 10° C./s; 280° C. |

TABLE 4-continued

Gas chromatography-mass spectrometry
analysis parameters for the VOC analysis run

| | |
|---|---|
| Column | Agilent 19091B-115, Ultra 2, 50 m * 0.32 mm FT 0.5 µm |
| Flow rate | 1.3 ml/min const. flow |
| Temperature programme | 50° C.; 2 min; ⇗ 3° C./min; 92° C.; ⇗ 5° C./min; 160° C.; ⇗ 10° C./min; 280° C., 20 min |
| Detector | Agilent MSD 5975 |
| Mode | Scan 29-350 amu 2.3 scans/sec |
| Evaluation | Evaluation of the total ion current chromatogram by calculation as toluene equivalent | c) Calibration: For calibration, 2 µl of a mixture of toluene and hexadecane in methanol (each at 0.125 mg/ml) were introduced into a cleaned adsorption tube packed with Tenax® TA (mesh 35/60) and measured (desorption 5 min; 280° C.).

d) Tenax® TA is a porous polymeric resin based on 2,6-diphenylene oxide and is obtainable, for example, from Scientific Instrument Services, 1027 Old York Rd., Ringoes, N.J. 08551.

e) Sample preparation for VOC measurement: 15 mg of foam were positioned in three sample portions in a thermal desorption tube. Care was taken not to compress the foam.

f) Sample preparation for fog measurement: The same foam sample was used as for the VOC analysis. With regard to the measurement arrangement, the VOC analysis was always conducted first and the fog analysis thereafter, ensuring a constant separation between each of the corresponding VOC and fog analyses by means of an autosampler system.

g) The fog measurement conditions are shown in Tables 5 and 6.

TABLE 5

Thermal desorption analysis parameters for the fog analysis run

| | |
|---|---|
| Thermal desorption | Gerstel TDS2 |
| Desorption temperature | 120° C. |
| Desorption time | 60 min |
| Flow rate | 65 ml/min |
| Transfer line | 280° C. |
| Cryofocusing | KAS 4 |
| Liner | glass evaporator tube with silanized glass wool |
| Temperature | −150° C. |

TABLE 6

Gas chromatography-mass spectrometry
analysis parameters for the fog analysis run

| | |
|---|---|
| GC | capillary - GC Agilent 7890 |
| Injector | PTV split 1:50 |
| Temperature programme | −150° C.; 1 min; ⇗ 10° C./s; 280° C. |
| Column | Agilent 19091B-115, Ultra 2, 50 m * 0.32 mm FT 0.5 µm |
| Flow rate | 1.3 ml/min const. flow |
| Temperature programme | 50° C.; 2 min; ⇗ 25° C./min; 160° C.; ⇗ 10° C./min; 280° C., 20 min |
| Detector | Agilent MSD 5975 |
| Mode | Scan 29-450 amu 2.3 scans/sec |
| Evaluation | Evaluation of the total ion current chromatogram by calculation as hexadecane equivalent | h) Calibration: For calibration, 2 µl of a mixture of toluene and hexadecane in methanol (each at 0.125 mg/ml) were introduced into a cleaned adsorption tube packed with Tenax® TA (mesh 35/60) and measured (desorption 5 min; 280° C.).

PVC discoloration test by Volkswagen test method VW PV 3937:

a) Preparation: For the test method, 1000 ml wide-neck bottles with tops are used. The wide-neck bottles must be clean and dry. In order to ensure this, the bottles are cleaned prior to use, rinsed with distilled water and stored in a drying cabinet for drying (heat to 100° C.) until shortly before the measurement. The PVC film (originally light grey in color) has to be cut out and introduced into the bottletop smoothly with the textured side in the direction of the bottle/specimen, such that the 1000 ml wide-neck bottle can be sealed airtight.

Procedure: About 24 hours after the reaction/foaming (+/−1 hour), a specimen of exactly 5×5×2 cm³ in size is cut out of the core, placed onto the base of the 1000 ml wide-neck bottle heated to 100° C., sealed airtight with the bottletop containing the PVC film and stored at a temperature of 100° C. for 72 hours. In order to prevent analysis variations, the specimen should be cut out of the core at least ≥3 cm away from the outside and out of the same area in each test. After 72 hours, the bottles are cooled to room temperature for 30 minutes. The PVC film is subsequently removed and subjected to a visual check for discoloration. For each measurement, a blank test should be conducted, i.e. a test without foam. After the blank test, no change in color should be apparent and the PVC film should still be grey.

Flexible Foam—Foaming Examples

Example 2

Production of HR Foams (Block/Moulded)

For the performance testing of the mixtures (M) according to the invention, the foam formulation specified in Table 7 was used.

TABLE 7

Formulation 2 for cold-cure flexible foam
applications (HR - slabstock/moulded).

| Formulation 2 | Parts by mass (pphp) |
|---|---|
| Polyol 1[1] | 70.0 parts |
| Polyol 2[2] | 30.0 parts |
| Water[3] | 3.70 parts |
| Glycerol | 0.50 part |
| Diethanolamine (DEOA) | 1.00 part |
| Amine catalyst[3] | 0.25 part |
| TEGOSTAB ® B 8716 LF2[4] | 1.00 part |
| Desmodur ® T 80[5] | 44.0 parts |

[1]Polyol 1: Sorbitol/glycerol-based polyether polyol with an OH number of 32 mgKOH/g.
[2]Polyol 2: Glycerol-based polyether polyol containing 43% of solids (SAN), with an OH number of 20 mgKOH/g.
[3]Amount of amine catalyst or amount of water adjusted correspondingly on use of amine mixture (I).
[4]Preparation of organomodified polysiloxanes.
[5]T 80 tolylene diisocyanate (80% 2,4-isomer, 20% 2,6-isomer) from Bayer, 3 mPa · s, 48% NCO, functionality 2.

In the foaming operation, 500 g of polyol were used; the other formulation constituents were adjusted correspondingly. In this arithmetic conversion, 1.00 part of a component meant 1.00 g of a substance per 100 g of polyol, for example.

For the foaming, the polyols, water, amine catalyst, crosslinker (DEOA and glycerol) and silicone stabilizer were mixed well by stirring. After the isocyanate had been added, the mixture was stirred with a stirrer at 2500 rpm for 7 s and the mixture was cast in a paper-lined wooden box (base area 27 cm×27 cm and height 27 cm).

The results from evaluating the catalytic properties of the amine mixture (I) according to the invention are collated in Table 8. Comparative catalysts used according to the prior art were triethylenediamine, 33% by weight solution in dipropylene glycol (TEGOAMIN® 33, available from Evonik Industries), 1,1'-{[3-(dimethylamino)propyl]imino}bis-2-propanol (TEGOAMIN® ZE 1, available from Evonik Industries), 1-[bis[3-(dimethylamino)propyl]amino]-2-propanol (Jeffcat® ZR-50, available from Huntsman). 0.25 pphp (=parts by weight based on 100 parts by weight of polyol) of amine catalyst was used in each case.

TABLE 8

Results of the foaming operations on formulation 2 (Table 7)

| Amine | Gel time [s] | Rise time [s] | Height [cm] | Fall-back [cm] | Cell count[1] [cm$^{-1}$] |
|---|---|---|---|---|---|
| TEGOAMIN ® 33 | 94 | 147 | 31.6 | 0.8 | 10.5 |
| TEGOAMIN ® ZE 1 | 132 | 214 | 30.5 | 0.0 | 9.5 |
| Jeffcat ® ZR-50 | 90 | 161 | 31.6 | 0.5 | 10.5 |
| DABCO ® NE 1070 | 154 | 221 | 26.4 | −0.1 | 9 |
| Amine mixture (I)[2] | 103 | 186 | 30.2 | 0.5 | 10 |

[1]Cell count = number of cells per cm [cm$^{-1}$].
[2]0.36 pphp of amine mixture (I) used (corresponding to effective amine content 0.25 pphp).

As can be inferred from Table 8, the amine mixture (I) according to the invention exhibited very good catalytic activity in the cold-cure flexible foam. With regard to the catalytic profile in this application, the amine mixture (I) can be classified as an amine catalyst that favours the gel reaction, and the nearly comparable activity with Jeffcat® ZR-50 and the stronger activity compared to TEGOAMIN® ZE 1 and DABCO® NE 1070 should be emphasized here.

The emission characteristics of the above-described foams were subsequently examined in accordance with test method VDA 278 in the version dated October 2011, as described above. The results are given in Table 9.

TABLE 9

Emissions of cold-cure flexible foams to VDA 278

| | Content of volatile organic compounds (VOCs) | | | |
|---|---|---|---|---|
| Amine | VOC$_{tot}$[1] [µg/g] | VOC$_{amine}$[1] [µg/g] | Fog$_{tot}$[2] [µg/g] | Fog$_{amine}$[2] [µg/g] |
| TEGOAMIN ® 33 | 499 | 183 | 287 | <10 |
| TEGOAMIN ® ZE 1 | 315 | <10 | 313 | <10 |
| Jeffcat ® ZR-50 | 336 | <10 | 409 | 101 |
| DABCO ® NE 1070 | 440 | <10 | 721 | 347 |
| Amine mixture (I) | 321 | <10 | 203 | <10 |

[1]VOC$_{tot}$ = total emissions; VOC$_{amine}$ = amine emissions of all volatile organic compounds at 90° C. (30 minutes).
[2]Fog$_{tot}$ = total emissions; Fog$_{amine}$ = amine emissions of all volatile organic compounds at 120° C. (60 minutes).

As can be inferred from Table 9, the amine mixture (I) according to the invention did not exhibit any emissions according to VDA 278, either in the determination of the VOC content or in the determination of the fog value. With regard to the VOC emissions, for example, Jeffcat® ZR-50, DABCO® NE 1070 and TEGOAMIN® ZE 1 also fulfil these requirements. However, TEGOAMIN® ZE 1 has a better fog value compared to Jeffcat® ZR-50, but is much weaker in terms of its catalytic activity. The amine mixture (I) has a much better catalytic activity than DABCO® NE 1070 and TEGOAMIN® ZE 1 in terms of fog emissions, but also improved values compared to Jeffcat® ZR-50, the catalytic activity being virtually identical compared to Jeffcat® ZR-50. For automobile applications, this means lowering of potential deposition of readily condensable substances in the automobile interior, for example on the windscreen, also referred to as "windshield fogging".

Example 3

Improvement of Processing in the Production of HR Foams (Block/Moulded)

A significant disadvantage of many conventional amine mixtures which are used as catalysts in polyurethane foam production is processing problems which result from the storage of amine mixtures; in other words, for example, storage, opening and closing of the container changes the composition of the amine mixture, such that it is no longer possible to assure constant catalyst performance after prolonged storage. In contrast, for example, using the amine mixture (I) according to the invention, more constant processing is enabled.

An illustrative comparison of the amine mixture (I) according to the invention with the amine mixture (II) not according to the invention was conducted using formulation 2 (Table 7). In each case 2 samples (100 g each) of the corresponding amine mixtures (I) and (II) were prepared in 250 ml glass bottles. To simulate the change in the composition, a sample of each mixture was stored under open and closed conditions at RT for a period of 22 hours. After the storage, the samples were foamed with the same use amount (0.25 pphp based on the amine content of the mixture). The amount of additional water (from formulation 2) was adjusted correspondingly for the amine mixtures (I) according to the invention. The results are given in Table 10.

TABLE 10

Comparison of the processing properties according to formulation 2 (Table 7).

| Amine mixture | Gel time [s] | Rise time [s] | Height [cm] | Edge zone | Cell count[1] [cm$^{-1}$] |
|---|---|---|---|---|---|
| Amine mixture (I) (closed storage) | 102 | 189 | 31.1 | OK | 10 |
| Amine mixture (I) (open storage) | 103 | 193 | 30.9 | OK | 10 |
| Amine mixture (II)[2] (closed storage) | 106 | 193 | 31.2 | OK | 10 |
| Amine mixture (II)[2] (open storage) | 116 | 223 | 29.6 | faults | 10 |

[1]Cell count = number of cells per cm [cm$^{-1}$]. [2]Amine mixture (II): N,N-dimethylaminopropylamine (70% by weight), 1,1'-{[3- (dimethylamino)propyl]imino}bis-2-propanol (30% by weight).

As can be inferred from Table 10, using the amine mixture (I), constant processing, i.e. comparable performance, was assured, irrespective of whether the amine mixture was stored closed or open. The composition of the amine mixture (II), in contrast, had changed so significantly after the open storage that it was not possible to achieve a reproducible result compared to close storage given the same use amount. Furthermore, the amine mixture (II) lost catalytic activity after open storage, which is apparent from the longer gel time and rise time, and the reduced foam height compared to the closed storage. In addition, faults were apparent in the edge zone of the foam. Both observations require adjustment of the amount of catalyst or of the foaming formulation, which is a distinct disadvantage, especially in industrial polyurethane foam production. Containers of amine catalysts are generally not used up completely for foaming operations and are stored over a prolonged period before the next use.

Example 4

Machine Experiments for Production of HR Foams (Block/Moulded) Using a Catalyst System Composed of Blow & Gel Catalyst Machine experiments for production of cold-cure flexible foams were conducted with a Hennecke HK 270 machine with MQ mixing head.

To simulate a particularly application-related cold-cure foam system, the machine experiments were conducted using the formulation 2 described at the outset (Table 7) with a blow amine catalyst and a gel amine catalyst in each case. The catalytic comparative system used was the system composed of 1-[bis[3-(dimethylamino)propyl]amino]-2-propanol (Jeffcat® ZR-50, available from Huntsman, as gel component) and 2-(2-(2-dimethylaminoethoxy)ethylmethylamino)ethanol (Jeffcat® ZF-10, available from Huntsman, as blow component). The system according to the invention used was the amine mixture (I) as gel component together with Jeffcat® ZF-10 as blow component.

The mouldable foam was produced in a heatable aluminium mould (40×40×10 cm). The mould temperature was set here to 67° C. and the demoulding time was 6 minutes. The foams were compressed by hand, stored at 21° C. and 50% air humidity for 7 days, and then the test specimens required for the physical measurements were cut out of the foam.

Characteristic parameters measured were the hardness (40% CFD) by the DIN EN ISO 3386-1:2010-09 method and 50% compression set by the DIN EN ISO 1856:2008-01 method. The same properties were measured after humid ageing by the DIN EN ISO 2440:2000-01 method (autoclave, 15 hours/120° C./100% air humidity). In addition, the above-described foams were examined with regard to the influence thereof on the discoloration of plastics. For this purpose, a PVC discoloration test according to Volkswagen test method VW PV 3937 as described above was conducted. After the study, the PVC film was subjected to a visual check. The results are summarized in Table 11.

TABLE 11

Results of the machine experiments on formulation 2 (Table 7)

| Catalyst system | 40% CFD [kPa] | 40% CFD after ageing [kPa] | 50% CS | 50% CS after ageing | PVC staining |
|---|---|---|---|---|---|
| 1[1)] | 2.2 | 2.6 | 10 | 29 | reddish discoloration |
| 2[2)] | 2.3 | 2.6 | 12 | 30 | no discoloration |

[1)]Catalyst system 1: gel component (Jeffcat® ZR-50): 0.50 pphp/blow component: (Jeffcat® ZF-10): 0.08 pphp.
[2)]Catalyst system 2: gel component A (amine mixture (I)): 0.89 pphp (corresponding to effective amount of amine 0.62 pphp)/blow component B (Jeffcat® ZF-10): 0.08 pphp.

As can be inferred from Table 11, it is possible by substitution of Jeffcat ZR-50 for the amine mixture (I) according to the invention to produce a polyurethane foam of equal quality, which becomes clear from the comparable values for foam hardness (40% CFD) and compression set (50% CS) among other properties. With regard to foam ageing too, it is thus possible here to obtain an equivalent foam on substitution of the conventional gel component for the amine mixture (I) according to the invention. It should be noted that the activity of the amine mixture (I) in this formulation is somewhat lower than that of Jeffcat® ZR-50. In order to achieve similar performance, it is therefore necessary to use more catalyst according to the invention. However, even though a greater amount of amine mixture (I) is used, emission advantages arise over the conventional catalyst combination 1 in the case of this formulation too. Thus, in spite of the greater amount of catalyst, no discoloration of the PVC surface by Volkswagen method VW PV3937 was observed, whereas reddish discoloration of the grey PVC polymer film was observed using the Jeffcat® ZR-50-based system. The discoloration of plastics parts is a problem, for example, in the case of use in automobile interiors.

The invention claimed is:

1. A polyurethane prepared from an isocyanate component, a polyol component, and a mixture (M) comprising the following constituents:
   (a) N,N-dimethylaminopropylamine, in an amount of from 40% to 95% by weight, and
   (b) at least one solvent, in an amount of ≥5% by weight,
   (c) from a tertiary amine in an amount of from 15% to 60% by weight, wherein the tertiary amine is selected from the group consisting of
   2-(dimethylamino)ethanol, 1,1'-{[3-(dimethylamino)propyl]imino}bis-2-propanol, bis(3-dimethylaminopropyl)amine, 1-[bis[3-(dimethylamino)propyl]amino]-2-propanol, 2-(diethylamino)ethanol, 1-(2-hydroxyethyl)pyrrolidine, 2-(2-(dimethylamino)ethoxy)ethanol, 2-(2-(diethylamino)ethoxy)ethanol, 2-(2-(pyrrolidin-1-yl)ethoxy)ethanol, bis(2-dimethylaminoethyl) ether, 1,1'-(oxybis(ethane-2,1-diyl))dipyrrolidine, N-(2-(dimethylamino)ethyl)-N,N',N'-trimethylethylene-1,2-diamine, N,N,N',N'-tetramethyl-1,6-hexanediamine, 2-((2-(dimethylamino)ethyl)(methyl)amino)ethanol, 2-((2-(2-(dimethylamino)ethoxy)ethyl)(methyl)amino)ethanol, or N-(2-(2-(dimethylamino)ethoxy)ethyl)-N-methylpropane-1,3-diamine.

2. The polyurethane according to claim 1, wherein (c) comprises bis(3-dimethylaminopropyl)amine in a total amount of from 35% to 60% by weight, based on the total weight of the mixture (M).

3. The polyurethane according to claim 1, wherein (c) comprises 1,1'-{[3-(dimethylamino)propyl]imino}bis-2-propanol in a total amount of from 35% to 60% by weight, based on the total weight of the mixture (M).

4. The polyurethane according to claim 2, wherein (c) comprises 1-[bis[3-(dimethylamino)propyl]amino]-2-propanol in a total amount of from 35% to 60% by weight, based on the total weight of the mixture (M).

5. The polyurethane according to claim 1, wherein the mixture (M) has a flashpoint of >60° C., measured by the Pensky-Martens method with a closed crucible in accordance with DIN EN ISO 2719:2003-09.

6. The polyurethane according to claim 1, wherein the mixture (M) comprises
   (a) N,N-dimethylaminopropylamine, in an amount of from 50% to 70% by weight, and
   (b) water as the at least one solvent, in an amount of ≥5% by weight.

7. The polyurethane according to claim 1 wherein the mixture (M) comprises
   (a) N,N-dimethylaminopropylamine, in an amount of from 50% to 95% by weight, and
   (b) at least one organic solvent, in a total amount of ≥10% by weight.

8. The polyurethane according to claim 1 wherein the mixture (M) comprises
   (a) N,N-dimethylaminopropylamine, in an amount of from 60% to 95% by weight, and
   (b) water and/or organic solvent as the at least one solvent in an amount of from 10% to 60% by weight.

9. The polyurethane according to claim 2, wherein (b) said at least one solvent is an organic solvent, and (c) comprises at least one amine selected from the group consisting of 1,1'-{[3-(dimethylamino)propyl]imino}bis-2-propanol, bis(3-dimethylaminopropyl)amine, and 1-[bis[3-(dimethylamino)propyl]amino]-2-propanol.

10. The polyurethane according to claim 9, wherein the molar ratio of the total amount of (c) relative to the total amount of isocyanate-reactive groups of the polyol component is from $4 \times 10^{-4}$:1 to 0.2:1.

11. The polyurethane according to claim 9, wherein (c) is used in a proportion by mass of 0.01 to 20.0 parts by weight per 100 parts by weight of polyol component.

12. A polyurethane foam comprising the polyurethane of claim 1.

13. The polyurethane foam according to claim 12, wherein said polyurethane foam is a rigid polyurethane foam, a flexible polyurethane foam, a viscoelastic foam, a cold-cure foam, a semi-rigid polyurethane foam, a thermoformable polyurethane foam or an integral foam, obtained using the mixture (M) in an amount of 0.005% to 10% by weight, based on the weight of the polyurethane foam.

14. The polyurethane according to claim 1, wherein the mixture (M) comprises
   (a) N,N-dimethylaminopropylamine in an amount of from 70% to 95% by weight, and
   (b) water as the at least one solvent in an amount of 10% to 40% by weight.

* * * * *